(12) United States Patent
Winzinger

(10) Patent No.: US 9,463,591 B2
(45) Date of Patent: Oct. 11, 2016

(54) CONTAINER TREATMENT MACHINE AND METHOD OF TREATING CONTAINERS

(75) Inventor: Frank Winzinger, Freising (DE)

(73) Assignee: KRONES AG, Neutraubling (DE)

(*) Notice: Subject to any disclaimer, the term of this patent is extended or adjusted under 35 U.S.C. 154(b) by 1166 days.

(21) Appl. No.: 13/446,017

(22) Filed: Apr. 13, 2012

(65) Prior Publication Data

US 2012/0260955 A1    Oct. 18, 2012

(30) Foreign Application Priority Data

Apr. 13, 2011    (DE) .................. 10 2011 007 280

(51) Int. Cl.
| | | |
|---|---|---|
| B65G 47/90 | (2006.01) |
| B29C 49/42 | (2006.01) |
| B65G 29/00 | (2006.01) |
| B65G 47/86 | (2006.01) |
| B29C 49/78 | (2006.01) |

(52) U.S. Cl.
CPC ......... *B29C 49/4205* (2013.01); *B29C 49/421* (2013.01); *B29C 49/4236* (2013.01); *B29C 49/4252* (2013.01); *B29C 49/78* (2013.01); *B65G 29/00* (2013.01); *B65G 47/847* (2013.01)

(58) Field of Classification Search
None
See application file for complete search history.

(56) References Cited

U.S. PATENT DOCUMENTS

| | | |
|---|---|---|
| 3,391,656 A | 7/1968 | Schafer |
| 3,415,916 A | 12/1968 | Valyi |
| 3,430,292 A | 3/1969 | Bauman et al. |
| 3,626,589 A | 12/1971 | Hansen |
| 3,770,098 A * | 11/1973 | Baugnies ............... B29C 49/70 198/377.03 |
| 4,005,966 A | 2/1977 | Nutting |
| 4,165,960 A | 8/1979 | Lemelson |
| 4,365,950 A | 12/1982 | Harry et al. |
| 4,768,942 A | 9/1988 | Sola et al. |
| 4,968,081 A | 11/1990 | Beight et al. |
| 5,253,911 A | 10/1993 | Egan et al. |
| 5,598,859 A | 2/1997 | Kronseder |
| 5,893,700 A * | 4/1999 | Kronseder ............. B08B 9/426 198/803.9 |
| 5,975,881 A | 11/1999 | Langos et al. |

(Continued)

FOREIGN PATENT DOCUMENTS

| | | |
|---|---|---|
| AT | 412622 B | 5/2005 |
| CN | 2470243 Y | 1/2002 |

(Continued)

OTHER PUBLICATIONS

European Search Report for EP 12 15 6689, dated Nov. 3, 2014.

(Continued)

*Primary Examiner* — Monica Huson
(74) *Attorney, Agent, or Firm* — Marshall, Gerstein & Borun LLP

(57) ABSTRACT

A container treatment machine with at least one gripper, which can be compulsorily transported along a predetermined transport section for handling a preform or container during transport and/or acceptance and/or delivery, and including, at a holder retaining at least two gripper claws, at least one controllable electric or magnetic drive for the gripper claws, where the gripper claws can be moved relative to each other in opening and closing directions and at least between defined gripping and release positions, and where each gripper claw can be individually separately actuated by the drive in the opening and/or closing direction relative to another gripper claw of the gripper. Alternately, both gripper claws can be actuated together in the same direction.

18 Claims, 11 Drawing Sheets

(56) References Cited

U.S. PATENT DOCUMENTS

| | | |
|---|---|---|
| 6,076,875 A | 6/2000 | Neff et al. |
| 6,220,310 B1 | 4/2001 | Emmer |
| 6,488,884 B1 | 12/2002 | Daubenbuchel et al. |
| 7,081,222 B2 | 7/2006 | Gram |
| 7,712,601 B2 | 5/2010 | Shimomura |
| 2010/0285169 A1 | 11/2010 | Blochmann |
| 2011/0133369 A1 | 6/2011 | Martini et al. |
| 2011/0198198 A1* | 8/2011 | Michel ............... B65G 47/905 198/803.6 |
| 2012/0260955 A1 | 10/2012 | Winzinger |

FOREIGN PATENT DOCUMENTS

| | | |
|---|---|---|
| CN | 101513769 A | 8/2009 |
| CN | 101885235 A | 11/2010 |
| DE | 2062283 A1 | 8/1971 |
| DE | 000002215494 B2 | 1/1976 |
| DE | 3133341 A1 | 3/1983 |
| DE | 261117 | 10/1988 |
| DE | 3730396 A1 | 3/1989 |
| DE | 3732881 C2 | 11/1989 |
| DE | 3832566 A1 | 4/1990 |
| DE | 19654350 A1 | 6/1998 |
| DE | 19912116 A1 | 9/2000 |
| DE | 19948474 A1 | 4/2001 |
| DE | 10054475 A1 | 5/2001 |
| DE | 19956186 A1 | 5/2001 |
| DE | 20007429 U1 | 5/2001 |
| DE | 10065591 A1 | 9/2002 |
| DE | 10259589 B3 | 4/2004 |
| DE | 10325693 A1 | 7/2004 |
| DE | 202005007347 U1 | 7/2005 |
| DE | 102005008685 | 9/2006 |
| DE | 102005041929 A1 | 3/2007 |
| DE | 102006023531 A1 | 11/2007 |
| DE | 102007037719 A1 | 2/2008 |
| DE | 102008038781 A1 | 2/2010 |
| DE | 102008039110 A1 | 2/2010 |
| DE | 102009006508 A1 | 7/2010 |
| DE | 60208936 T3 | 10/2010 |
| DE | 102009020738 A1 | 11/2010 |
| DE | 102009021792 A1 | 11/2010 |
| EP | 0679480 A1 | 11/1995 |
| EP | 0721808 A1 | 7/1996 |
| EP | 0858963 A2 | 8/1998 |
| EP | 1060865 A2 | 12/2000 |
| EP | 1535719 A1 | 6/2005 |
| EP | 1226017 B1 | 3/2006 |
| EP | 2008793 A1 | 12/2008 |
| EP | 2295324 A1 | 3/2011 |
| EP | 2332846 A1 | 6/2011 |
| FR | 2700293 A1 | 7/1994 |
| WO | WO-9323232 A1 | 11/1993 |
| WO | WO-9630189 A1 | 10/1996 |
| WO | WO-9822374 A1 | 5/1998 |
| WO | WO-9851608 A1 | 11/1998 |
| WO | WO-9947330 A1 | 9/1999 |
| WO | WO-9962692 | 12/1999 |
| WO | WO-0126882 A1 | 4/2001 |
| WO | WO-2007096042 A1 | 8/2007 |
| WO | WO-2008017485 A1 | 2/2008 |
| WO | WO-2009144664 A2 | 12/2009 |
| WO | WO-2010020529 A2 | 2/2010 |

OTHER PUBLICATIONS

German Search Report for 10 2011 007 280.2, dated Mar. 13, 2012.
International Search Report for PCT/EP2012/059109, dated Nov. 20, 2012.
Search report for DE 10 2011 079 078.0, dated Apr. 4, 2012.
International Search Report for PCT/EP2012/058898, dated Aug. 1, 2012.
Search report for EP 12 16 7302, dated Dec. 21, 2012.
Search report for DE 10 2011 079 076.4, dated Apr. 5, 2012.
Search report for DE 10 2011 079 077.2, dated Apr. 19, 2012.
European Search Report for Application No. EP12167302 dated Feb. 25, 2014.
Notification of the First Office Action for application No. 2015042901111960, The State Intellectual Property Office of the People's Republic of China, dated May 5, 2015.

* cited by examiner

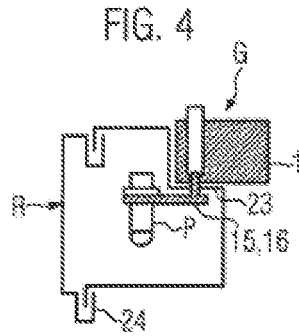
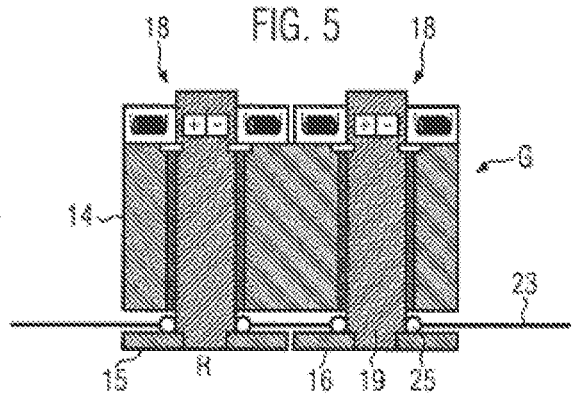
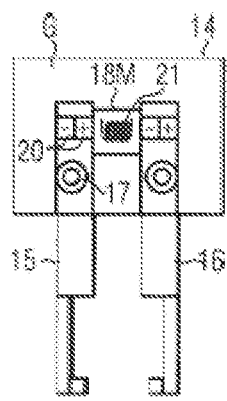
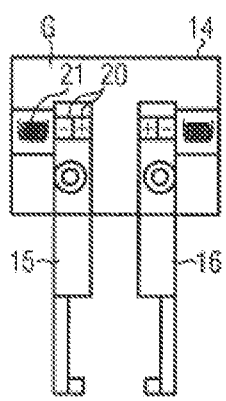
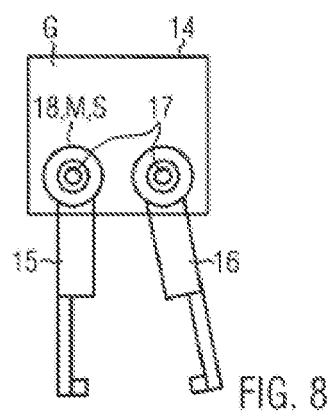
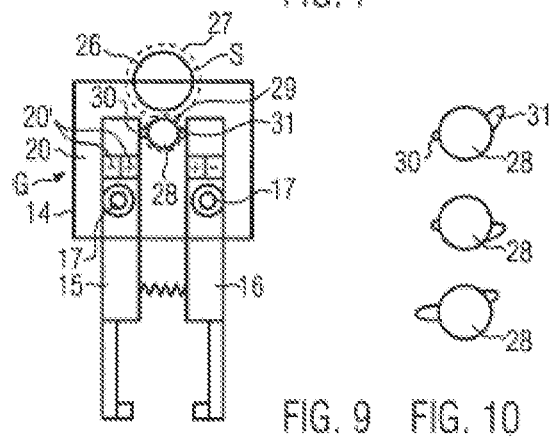

CONTAINER TREATMENT MACHINE AND METHOD OF TREATING CONTAINERS

CROSS-REFERENCE TO RELATED APPLICATION

The present application claims the benefit of priority of German Application No. 102011007280.2, filed Apr. 13, 2011. The entire text of the priority application is incorporated herein by reference in its entirety.

FIELD OF THE DISCLOSURE

The disclosure relates to a container treatment machine with a holder having gripper claws, and a corresponding method.

BACKGROUND

U.S. Pat. No. 5,253,911 A discloses a controlled gripper wherein at its holder of two gripper claws, an electric servomotor is mounted which symmetrically swivels, via a rotary cam, the gripper claws in the closing direction against the force of an opening spring. The gripper claws not only symmetrically move in opposite directions, but compulsorily assume exactly predetermined relative positions at the holder in the gripping position and in the release position. These relative positions very precisely determine the position of the gripped object and the gripping and deposit points with respect to the holder. These relative positions are invariable.

WO 98/22374 A discloses a controlled gripper whose two gripper claws are actuated in parallel and symmetrically with respect to each other in opposite directions each linearly by an electric servomotor mounted at the holder. The gripping position and the release position, or the gripping and deposit points, respectively, have exactly predetermined relative positions relative to the holder which are invariable.

Gripper claws of such controlled grippers actuated by electric servomotors offer the advantage of a sensitive control and the elimination of mechanically complicated curved path controls which require lubrication and are therefore not hygienic and occupy much space, as they have for decades become the standard for controlled grippers in container treatment machines.

WO 2009/144664 A discloses an uncontrolled gripper where mechanical or magnetic energy storage mechanisms symmetrically act on its gripper claws, for example in the closing direction, and where the gripper claws are forced apart in the opening direction by the preform or container during acceptance or delivery. Such uncontrolled mechanical grippers generate high closing forces in the gripping position which can generate, for example at heated preforms, deformations or, in the acceptance or delivery of containers, undesired frictional forces. An electric servomotor, which acts at an arm supporting the holder of the gripper, swivels the gripper relative to the center of rotation of a starwheel defining the transport section, for example to compensate a pitch distortion or to change the relative distances between successive preforms or containers. The servomotor does not have any influence on the gripper claw movements.

Among other things, it is the job of the gripper in a container treatment machine or in a transport section between container treatment machines in a container treatment plant to transport the preform or container, to accept it from a transport section or station of a container treatment machine at an exactly predetermined position, and to deliver it to another transport section or station of a container treatment machine at an exactly predetermined position. For this, controlled or uncontrolled grippers with two or more than two gripper claws are common. Controlled grippers are actuated into the opening and/or closing direction, while uncontrolled grippers have a mechanically defined gripping position to which the gripper claws are pretensioned, for example by an energy storage mechanism, such as a spring, or by magnets. In the acceptance or delivery, the gripper claws of an uncontrolled gripper are opened with a relative motion of the preform or container against the force of an energy storage mechanism, whereupon they are moved towards each other again by the energy storage mechanism.

In procedures in container treatment plants or in container treatment machines, however, different problems arise in practice which result, among other things, from the functional principle of the grippers, wear, work tolerances and a susceptibility of the treated preforms or containers to mechanical loads generated by the grippers.

For example, the gripper accompanies, in the delivery of a preform into the blow mold of a blow molding station, the blow mold along a portion of its, for example, circular path about the machine's axis. With high machine performances, for example, of a rotary machine (up to 72000 containers/h), the gripper follows the blow mold, by means of overlaid swiveling and linear motions of a controlled transfer arm, simultaneously aligning the center of the preform with the center of the blow mold until the blow mold is closed. With an uncontrolled gripper, the closed blow mold in which the preform is seized pulls the preform out of the gripper. This drawing off, however, results in a shaking displacement of the preform in the blow mold. This fault can be reduced by using a controlled gripper (active opening, spring-loaded closing). Nevertheless, an oscillating motion of the preform often occurs due to which the preform is no longer positioned sufficiently exactly relative to the blow mold halves. The preform is then touched first by one of the halves of the closing blow mold and displaced. This disadvantageous effect is even amplified by the small difference in the diameter in the holding region of the blow mold compared to the diameter of the preform. Due to a displacement of the preform in the blow mold in such a disharmonic delivery from the gripper, the stretching rod inserted into the blow mold does no longer hit the center of the preform's bottom dome as actually predetermined. A so-called off-center effect occurs where the injection point or pressure point of the preform usually located in the center of the container's bottom is displaced to the outside to container bases. This results in an unstable container bottom as the wall thickness is thicker on one side than on the side of the bottle bottom where the stretching rod contacted the preform eccentrically. The deposit point is adjusted by the operator as precisely as possible via adjusting facilities at the gripper, at the starwheel or at the blow mold during the installation. However, it regularly occurs that the maintenance intervals for precise recalibration are not respected. Such recalibration optionally also becomes necessary when the machine performance is increased or reduced because this, too, can result in a displacement of the deposit point adjusted during the installation.

In the preferential heating of preforms, each preform is introduced, at a holding arbor or an internal gripper, into an intermediate module after a heat treatment uniform in the circumferential direction, where in the intermediate module, discrete regions, e.g. of the side wall, are touched by at least two e.g. shell-like contact elements to apply a temperature profile varying in the circumferential direction (e.g. by heat abstraction) before the preform is blow molded. This is suitable, for example, for the manufacture of a noncircular or oval container which is to obtain identical and/or different wall thicknesses both in regions more strongly stretched in the circumferential direction as well as in regions less strongly stretched in the circumferential direction. Depending on the procedure, the preform is squeezed by the contact elements to an extent that cannot be adjusted to date because the contact elements then acting as gripper claws of a multifunctional gripper (e.g. transport function, positioning function, squeezing function, temperature controlling function), always grip the preform in the same manner e.g. via cam controls. In case of a change of types, at least the contact elements must be exchanged to date, which is very time-consuming.

Furthermore, differently dimensioned preform or container types require different gripping forces in the acceptance, delivery and during transport, while conventional grippers do not permit a force control or path control of the gripper claws to date.

In a blow molding station of a stretch-blow molding machine, the stretching rod drive sometimes fails, so that the stretching rod is not properly retracted from the blow mold after a blow-molding process when a new preform reaches the empty blow mold. Since conventional grippers operate with a compulsory and invariable motion sequence, one cannot consider the dangerous situation in case of a failure of the stretching rod drive, so that a collision between the preform held by the gripper and the stretching rod occurs, resulting in a malfunction. This also applies to other incorrect positions of parts of a blow molding station caused by a failure, such as the blow mouth, the mold locking, or the like.

In a container treatment machine, adjacent rotary machine sections, such as a blow-molding unit and a preform transfer starwheel, are adjusted to each other with a train of gears for a certain machine performance. During the installation, a misalignment of up to 0.3 mm is, for example, intentionally adjusted between the deposit point of the gripper and the center of the blow mold. With the determined machine performance, for example of 2000 containers/h, the operational load in normal operation then compensates the misalignment in the train of gears, for example of a belt connection, to zero, so that the preforms are exactly aligned with the center of the blow mold when they are deposited. If, however, the container treatment machine is operated at a lower machine performance, for example below 1000 containers/h, the operational load in the train of gears becomes lower, so that the adjusted alignment is then possibly no longer compensated and preform delivery problems occur if no corresponding previous change of the misalignment has been performed, which is time-consuming. To date, the grippers are not able to compensate this disadvantage without prior calibration works.

Grippers of a transport starwheel which accept preforms from holding arbors or internal grippers and transport them from the oven to the blow molding machine operate with a predetermined gripping power, although heavy or light preform types require different holding forces, as, for example, due to centrifugal force, heavy preforms have to be positioned more firmly than lighter preforms which naturally also have a less stable mouth or a slightly heated and therefore deformable thread. In case of a change of the preform type, therefore the gripping force would have to be correspondingly adapted, which is time-consuming and in many cases not possible as the gripping movement cannot be force-controlled and/or path-controlled.

In case of a temperature control of a preform in the oven, the preform is held with an internal gripper or a holding arbor from which the preform is taken, due to the geometry in the relative motions between the holding arbor and the transport starwheel, by the gripper of a transport starwheel forming a transport section which transports it to the blow molding machine. Preforms often have low threaded mouth regions at the mouth section, so that the holding arbor must immerge relatively deeply. Due to this, it can be located, during the acceptance, in the level of motion of the gripper claws of the accepting gripper. If now no preform is delivered by the holding arbor due to a malfunction, or if a defective preform has been discharged before, or if the machine is operated in the mode "only use every second pitch", with conventional grippers, a collision between the gripper claws of an uncontrolled gripper and the holding arbor cannot be avoided because no preform is located in-between. This can lead to damages at the holding arbor and/or the gripper claws.

In a sterilizer or rinser, the gripper positions the preform or container with its mouth in alignment with an inlet nozzle for a sterilizing or rinsing agent which is introduced into the mouth under pressure obliquely or asymmetrically during a cycle. Here, the gripper can, during the cycle, even place the mouth rim of the mouth in positioning contact e.g. against at least one web holding the inlet nozzle. In order to be able to also treat the mouth rim and/or at least parts of the external thread of the mouth with the agent, a deflection bell can be placed above the inlet nozzle which deflects the agent exiting from the preform or container and applies it onto the mouth rim and/or externally onto the thread. A conventional gripper holds the preform or container during the complete cycle in an exactly predetermined position relative to the inlet nozzle which makes it difficult to intensify the treatment or to also properly treat the contact region between the mouth rim and the web and/or gripper claw contact regions. Here, at least an individual adjustability of the mouth relative to the inlet nozzle would be suitable, which, however, does not exist in conventional grippers. The procedure is similar in a rinser in the treatment with a rinsing agent. In particular, the gripper claws are swiveled in a plane which is perpendicular to the axis of the rinser or sterilizer jet. However, it would also be conceivable, as an alternative or in addition, to swivel the grippers such that the injection angle changes relative to the longitudinal axis of the containers to be treated. For this, an additional drive can also be provided. It would also be conceivable to measure the containers and/or their mouths before they enter the sterilizer with a sensor or a camera and to position the grippers on the basis of the measurement such that the jet of the sterilizer or rinser medium is individually adapted to each container. In particular, an optimal distance from the container mouth rim to the jet can be predetermined, either in percentages of the diameter or in millimeters from the rim. In containers with larger mouth diameters, the gripper claws would, after a central transfer, cover a further distance to the optimal position. As an alternative, the container could also be delivered to the gripper claws of the rinser or sterilizer eccentrically by this measure—i.e. already with the optimal distance to the nozzle.

Due to their curved path controls, conventional grippers often cause problems in the operation in a clean room environment, for example at transfer arms of transfer starwheels, as by wear and the required lubrication of the curved path controls, contamination of the clean room atmosphere can be hardly avoided, or as it is difficult to install clean room seal, which are technically extremely complicated. Here, grippers whose movements do not depend on a curved path control would have an essentially better clean room capability, paired with an individual actuation of the gripper claws which does not exist in conventional grippers at present.

In some container treatment plants, buffer transport sections or a so-called air transport device for carrying off containers are common. The containers are accelerated and transported inside them by air jets. In practice, however, problems can occur if a container handed over by a gripper of a transfer starwheel is not immediately properly accelerated and carried off by the air jets. Then, a jam of containers that can lead to container damages and requires the operator's intervention can occur. Conventional grippers completely disengage from the containers during transfer, so that it is up to the air transport device alone to properly accelerate the delivered container and to carry off containers at predetermined distances. A jammed delivered container can be even temporarily squeezed in the guidance of the air transport device by the following gripper claw of the gripper symmetrically set to the release position due to the bottom movement of the transfer starwheel because the gripper claw cannot be adjusted beyond the release position.

SUMMARY OF THE DISCLOSURE

One aspect of the disclosure is to provide a container treatment machine with grippers better adapted to operational problems and methods that can be performed with such improved grippers, wherein the grippers better live up to practice-related problems individually and universally in the acceptance, delivery and during the transport of preforms or containers than to date, and to allow these grippers to perform container treatment methods in such a manner that a higher final quality results thanks to better operating grippers. This technical problem comprises several sub-problems, which are the following ones:

With respect to a higher quality of the final products or intermediate products, the grippers should permit individually adjustable acceptance, delivery and transport conditions, permit recalibration or error compensation automatically and without manual personnel intervention, allow individual actuation in case of operational failures or in certain operational situations to prevent damages, allow to adapt, as quickly as possible, the closing force or flow velocity to different preform or container types, permit flexible conversion to different fittings, and allow to carry out an also asymmetric opening and/or closing by remote control which is not possible to date.

If at least one, suitably each of the two or three gripper claws of the respective gripper, can be individually and/or separately actuated in the opening and/or closing direction relative to another gripper claw of the gripper by the drive arranged at the holder, the above mentioned operational problems in container treatment machines can be universally and flexibly mastered with the gripper. The individual and/or separate actuation of the at least one gripper claw by the at least one drive at the holder permits an easy and quick remote-controlled reaction to operational irregularities in the process of accepting and delivering, and during transport. As an alternative, the gripper claws can be actuated relative to the holder in the same opening and/or closing direction of the gripper while maintaining the gripping position. With gripper claws that can be moved linearly and in parallel to themselves, these then perform the same motion strokes. With gripper claws that can be swiveled, the latter optionally even perform different motion strokes or swiveling motions while maintaining the gripping position to prevent the holding force from increasing or being reduced. The gripper can be flexibly converted to other fittings and/or types. The for example common external cams for opening the gripper and/or controlling the transfer arm can be eliminated, so that due to the elimination of lubrication and wear-related contaminations, cleanability can be improved or cleaning is no longer necessary, making maintenance or cleaning cycles rarely or not at all necessary. Here, it should be noted that the activation of the drive does not necessarily have to be equated with the actuation of the at least one gripper claw. Basically, by the individual and/or separate actuation of the at least one gripper claw of the gripper by the at least one drive at the holder of the gripper claws, at least one further degree of freedom for the treatment, positioning or prevention of damage is imparted to the gripper in the operation of the container treatment machine, allowing to improve the final quality of the treatment because the gripper can actively solve unpredictable or imminent operational problems if the gripper claws do not always only fulfill exactly predetermined functions but can be individually and/or separately actuated with electrically or magnetically controlled opening or/and closing movements.

The grippers according to the disclosure can be universally used in transport sections of different container treatment machines and/or container treatment plants, for example in a preform injection-molding machine which works in a one-stage or two-stage process, for example at transfer starwheels in precise adjustment to the opening and closing movements of the injection mold upstream and downstream, at transfer starwheels downstream of the heating module of a blow molding machine, in reduction starwheels for the transfer of the preforms in blow molds, in an intermediate module for performing a preferential heating process, in preform and/or container sterilizers, at blow mold supports analogously, for example, to WO 99/622692 A and DE 10 2005 008 685 A, in a rinser, a filler, a labeling machine, in a preform transport starwheel, in other transport sections for preforms and/or containers, in coating machines, in laser cutting machines for PET can manufacture, as grippers holding containers in the body region, for plastic as well as for glass containers, in direct printing units, and the like.

Here, the grippers according to the disclosure are suited for continuous transport or clock-wise transport, for rotary or linear container treatment machines, for transport sections of different geometries, and also for meandering transport sections or buffer systems, or linear transport sections, for example with a belt supporting the grippers, in shuttle systems, in particular magnetic shuttle systems in which each shuttle with the grippers only conveys, for example in a bottling plant, a predetermined number of containers, optionally only one at a time, for transport sections in a clean room preferably under overpressure with sterile air, wherein the boundary walls of the clean room and machine components arranged therein can be cleaned (CIP), and the like.

The gripper according to the disclosure can be an uncontrolled or controlled gripper, wherein an uncontrolled gripper becomes, by the individual and/or separate actuation of the at least one gripper claw, an at least temporarily controlled gripper. With a controlled gripper, the individual and/or separate actuation of the at least one gripper claw can be overlaid over the, for example, normal opening movement, or be employed for basic gripper control.

A method of delivering a preform into a split blow mold of a blow molding station is characterized in that, with the still opened blow mold before the transfer, the relative position between the blow mold center or the blow mold halves and the center of the preform held in the gripping position of the gripper, is detected by at least one detection sensor and evaluated in view of a deviation (for example a misalignment) at least in or opposite to the common direction of transport of the gripper and the blow mold, and if a deviation is detected, at least the gripper claws are actuated together, while maintaining the gripping position, relative to the holder of the gripper claws until the deviation or the misalignment are at least largely compensated before the transfer of the preform is completed and the blow mold is closed. In this manner, problems related to the operation, such as a shaking or displacement of the preform relative to the blow mold, with the disadvantageous consequences for the quality of a blow-molded container, are avoided by the controllable function of the gripper.

In another method of delivering a preform into a split blow mold, in the approach of the preform held in the gripper in the gripping position to the opened blow mold before the transfer, the relative position e.g. of the stretching rod or the blow nozzle with respect to the opened blow mold is detected by at least one detection sensor and evaluated with respect to a failure-related presence of the blow nozzle at, or the stretching rod or a portion of the stretching rod in the opened blow mold. If the result of evaluation is positive, the gripper claws of the gripper are actuated e.g. into the release position by a correspondingly informed control for the at least one drive at the holder of the gripper, so that the preform is dropped before it collides with the stretching rod or the blow nozzle, and subsequently, optionally the gripper claws are even intentionally held in the collision-safe release position or kept even further opened at least until the blow mold closes to reliably exclude a collision between the gripper claws and the stretching rod and/or the blow nozzle and/or the blow mold. The at least one detection sensor thus only intervenes in the normal operation if this is required to exclude any disadvantageous consequence of a failure-related presence of the stretching rod and/or blow nozzle in the opened blow mold, or the like, using the possibility of the individual gripper claw actuation. The actuation principle of the gripper claws can thus also be transferred to a faulty non-lifting of a blow nozzle or the non-unlocking or non-opening of the mold halves of a split blow mold. In general, an incorrect position of individual parts of a blow molding station is detected e.g. by sensors and evaluated or assessed for or by the control, and subsequently, a collision of the preform or the gripper claws with parts of the blow molding station, such as the blow mold, the blow nozzle or the stretching rod, is prevented by ejecting the preform and/or swiveling away the gripper claws.

In a method of sterilizing or rinsing a preform or container, the position of the mouth relative to the inlet nozzle and transverse to the outlet direction of the sterilizing or rinsing agent from the inlet nozzle is changed in the sterilization during a sterilizing cycle for intensifying the sterilization effect of the sterilizing or rinsing agent by individually actuating the gripper claws via the at least one electric or magnetic drive while maintaining the gripping position, so that not only the sterilization or rinsing quality is improved, but it is also possible to use a smaller amount of agents. Preferably, the position of the mouth is changed several times utilizing the period of the cycle. If a positioning web is provided at which the gripper positions the mouth opening rim relative to the inlet nozzle, by the change of the position of the mouth, the region of the mouth opening rim covered by the positioning web is also properly sterilized or rinsed, contributing to the final quality of the preform or container, respectively. If an additional holding element for the container is provided, the gripper claws can be temporarily made loose to also properly sterilize the gripper claw contact regions at the container. This can also be suitable if a deflection bell for exiting agent is provided which directs the agent, by the intentional change of the position of the mouth by means of the gripper, intensely to all regions of the thread outside of the mouth. To reduce the covering effect of the positioning web, the web's back could be moreover structured, ribbed or pimpled to facilitate the penetration of the agent.

In a further method of taking a preform from a holding arbor, in particular of a heat treatment section, the gripper claws of the gripper preferably to be opened by the preform, that means an actually uncontrolled gripper, are individually actuated before the preform is taken from the holding arbor by at least one electric or magnetic drive arranged at the holder, preferably a controllable servomotor, by routine activation of the drive (programmed in the control) or by an activation of the drive as required (by using a sensor which detects and evaluates the situation at the holding arbor). This security function of the gripper would be actually not necessary for normal operation, but it serves to preemptively avoid damage in case the holding arbor does not supply a preform which can have different operation-related reasons which might not be foreseeable. If a detection sensor determines that the holding arbor does not supply a preform, the gripper claws can be individually actuated such that they are either held in the release position or are purposefully brought from the gripping position adjusted by an energy storage mechanism to the release position for opening the preform. This can be performed by the control of the drive of the gripper claws even without the aid of a detection sensor, for example if the control is informed that no preform is supplied, or if in a station of the machine, an empty holding arbor is detected or was intentionally left empty, which is communicated to the control. For example, the entry barrier for preforms for the entry into the oven section could be closed, so that then no more preforms must be transported and gripped. It would be furthermore possible to actuate the gripper claws to a gripping position in the course of a program routine, but only to such an extent that a preform could be gripped, but not the holding arbor having a smaller diameter. For this, a detection sensor is not absolutely necessary, but this program routine could be performed by a force control of the drive of the gripper claws. If in expectance of a preform, no gripping force is built up then, this is taken as an indication of the absence of a preform, and the gripper claws are either held in this not completely delivered position or returned to the release position. To reliably avoid collisions with the holding arbor, the gripper claws could even be opened beyond the release position by individual actuation. In this manner, no failures or damages occur if the preforms are absent, in particular even in a case where a preform, following modern tendencies to save material for the preform, has such a low thread that the holding arbor engages into the level of the trajectory of the gripper claws. It can be in particular very advantageous to realize the evaluation directly via a path- and force-controlled actuation of the gripper claws. The gripper claws are e.g. moved to the position where normally a preform is located by the drive by path control. At this position, one switches to force control. If the control of the drive detects that no holding force is building up, this confirms that there is no preform on the holding arbor. The gripper claws are then no longer closed or opened for gripping a preform. The gripper claws are even suitably adjusted to the opposite direction, i.e. the opening direction, to avoid a collision between the holding arbor and the gripper claws with increased reliability. The angle or path to be passed in the path control depends on the preform and can be previously entered into the control by the user, as also the gripping force generated with the force control. It is also possible to detect and evaluate it by an in particular optical sensor.

In a suitable embodiment of the container treatment machine, both or all provided gripper claws can be differently actuated via one common, or via a separate electric or magnetic drive each. If a common drive is provided at the holder, the motion and/or force transmission to the gripper claws must be correspondingly designed to not only actuate them symmetrically, but also differently. If each gripper claw has its own drive, the different actuations can be particularly easily controlled by open-loop, and optionally by closed-loop control. The respective electric drive could be designed as a piezoelectric drive.

In an advantageous embodiment of the container treatment machine, two gripper claws are provided. The gripper claws can be moved at the holder either each swiveling about a swivel axis, or each in parallel to itself and linearly (tongs principle or vernier principle). Here, the two gripper claws preferably comprise gripping regions which, for the preform or container, in the gripping position generate together a two-point or three-point, or even a four-point holding effect, so that the preform or container, which is gripped at the mouth region or at the external wall, is always forced to assume a precise positioning between the gripper claws, and also such that the individual and/or separate actuations of the gripper claws are transmitted to the preform or container, respectively, in a precisely predetermined manner, and the latter cannot automatically change its position in an uncontrolled manner.

As to the control, the swiveling gripper claws can be suitably actuated relative to the holder in the same swiveling direction but individually, i.e. differently, e.g. via individual different swivel angles, while maintaining the gripping position. Here, the swivel axes of the two gripper claws are preferably spaced apart, for example such that in a starting gripping position, both gripper claws stick out from the holder approximately in parallel with respect to each other and perpendicularly.

In a suitable embodiment, the respective separate magnetic drive of a gripper claw comprises inversely polarized permanent magnets connected with the gripper claw and at least one magnet coil connected to the control. To be able to actuate each gripper claw in both directions of motion by precise open-loop or closed-loop control, per gripper claw, two magnet coils are preferably allocated to the permanent magnet, although one magnet coil can absolutely accomplish different swivel strokes by corresponding current control while maintaining the gripping position. This is a structurally simple and inexpensive as well as functionally reliable embodiment, wherein, however, sensitive control or activation is aggravated, and optionally an energy storage mechanism can act upon the gripper claws at least for generating a basic holding force.

A particularly suitable embodiment is characterized in that the respective separate electric drive of a gripper claw comprises an electric servomotor connected to a control, preferably a force- and/or path- and/or position-controlled servomotor. Such servomotors are inexpensively available in most diverse specifications, can be operated with a moderate amount of energy, can be sensitively controlled, can be suited for clean rooms, and have small dimensions and a low weight. The electric drive could be designed as piezoelectric drive. Here, a respective separate servomotor of a gripper claw is optionally either placed as direct drive at the swivel axis of the gripper claw in the holder, or coupled with the swivel axis or a shaft via a toothed gearing. As the swivel axes, the two servomotors can be installed next to one another at the holder thanks to their small dimensions. Suitably, and for saving installation space, however, both servomotors are arranged in a superimposed manner and one upon the other and/or behind the other, resulting in a very compact structural shape of the gripper. A toothed gearing can contain plastic gears which are self-lubricating and of light weight.

For the preform or container to be displaceable in the gripping position not only essentially in and opposite to the direction of motion of the holder via the gripper claws, but also in the longitudinal direction of the gripper claws, for example to compensate or even overcompensate a misalignment of the center of the preform or container due to the swivel motion of the gripper claws, in a further suitable embodiment, at least one of the gripper claws is embodied to be telescopic in its longitudinal direction, wherein an electric or magnetic accessory drive or servomotor for telescoping the gripper claw is provided. Preferably, a linear or a rotary drive, or a linear and a rotary drive, preferably with at least one electric servomotor, acts upon a holder support, such as a pitch distortion compensation arm or a support plate, for adjusting the holder relative to the holder support, and at least one drive for both gripper claws or one separate drive each for each gripper claw is provided at the holder, at least for displacing the gripper claws relative to the holder, preferably while maintaining the gripping position. This special gripper can, for example in the movement of its holder, make the center of the gripped preform or container at least temporarily follow the trajectory of the center of a blow mold or the like, suitably without using up to now conventional curved path controls. This gripper drive principle is particularly suited for a reduction starwheel of a container treatment machine or in intermediate stations of container treatment machines in a container treatment plant, or in an intermediate preferential heating module.

It is in particular also thought of holding a preform with at least three individually and/or separately actuated gripper claws. In this manner, it is, for example, possible to first grip the preform with two gripper claws, and to move the preform with the at least one further gripper claw relative to the two holding gripper claws to a desired position. This principle can be used in all methods, for example advantageously for the alignment and positioning, but also for the temperature-control (preferential heating process) or the ejection of a preform. Here, it is conceivable that the two initially gripping gripper claws can be actuated by a common drive, but the third or each further gripper claw is actuated by a separate drive. In this manner, a desired central position of preforms having, for example, different diameters can be adjusted or controlled in a change of type, or the squeeze in the preferential heating process can be adjusted or controlled, respectively.

In a further suitable embodiment, the two swiveling gripper claws can be actuated in the same direction by different swivel angles, while maintaining their gripping position, by a common servomotor as, suitably controllable, electric drive arranged at the holder, a toothed or cam gear being inserted, for example to compensate a misalignment between the center of the preform and the center of the blow mold or the blow mold halves without abandoning the gripping position. However, the toothed or cam gear can also be embodied such that, while the gripping position is maintained, the holding force is reduced shortly before or during the closure of the blow mold. For the toothed or cam gear, plastic gearwheels or plastic cams or composite gearwheels or composite cams offer themselves here, which are, for example, self-lubricating and of low weight. A common electric drive could be designed as piezoelectric drive.

In a suitable embodiment of the container treatment machine, the gripper with gripper claws that can be actuated in parallel to themselves and linearly comprises at the holder each a separate linear servomotor or a rotary servomotor with a toothed gearing. Not only does the electric servomotor permit a sensitive control of the actuations and forces, but also supplies the control with precise information on the respective position and/or force of the gripper claws. In another preferred embodiment of the container treatment machine, the gripper claws of the gripper can be actuated in parallel to themselves and linearly. Here, a linear motor is provided as a drive whose stator arranged at the holder comprises two linear inductors actuating one gripper claw each. This, however, does not exclude to provide a separate linear motor for each gripper claw.

In a suitable embodiment of the container treatment machine, selectively retrievable different holding force profiles and/or temperature-control contact element contact pressure profiles for different or differently dimensioned types of preforms or containers and differently wide, previously defined gripping positions are stored in the control for the drive or drives of the gripper. This permits a quick adaptation or conversion, for example in case of a change of types or a change of the machine performance and the like, and this without any manual intervention by an operator, or the possibility of recalibration at any time in case of occurring or imminent quality losses of the preforms or containers. In case of a change of types, the respectively matching gripping position of the gripper claws is selected by remote control which helps to considerably reduce change-over times. Moreover, desired positions, desired lengths of the gripper claws and the like, in allocation to differently dimensioned types of preforms or containers can be programmed or retrievable or adjustable without operators having to work at the grippers. This programmability and/or adjustability of the control is suitable with the individual and/or separate actuation of the gripper claws of the gripper to be able to profitably utilize the at least one additionally created degree of freedom of the gripper as compensation possibility for different container treatment methods.

Since the gripper with the at least one drive at the holder does not require any complicated curved path controls, at least the gripper with its gripper claws can be easily placed in a clean room. A clean room seal or boundary is arranged, for example, at the holder between the at least one drive or servomotor and the respective gripping region of the gripper claw. This seal can be a seal of a clean room boundary wall or a boundary bellow supported between each gripper claw and the holder at the swivel axis of the gripper claw. A bellow easily follows the movements of the transfer arm, especially in case of a reduction starwheel equipped with grippers.

In a further suitable embodiment of the container treatment machine, the gripper is a preform supply and transfer gripper in a starwheel of a blow molding station comprising split blow molds of a container treatment machine embodied as a stretch-blow molding machine. The control of the drive or of each separate drive of the gripper claws is connected with at least one sensor array, preferably a camera or a proximity initiator, which measures and evaluates the relative position between a preform ready for transfer in a gripper and either the center and/or the mold halves of the blow mold, or even a stretching rod that remained in the blow mold due to a failure, or a not lifted blow nozzle and/or a not unlocked blow mold locking mechanism. The evaluation result is evaluated for controlling the drive or each separate drive of the gripper claws either to reposition the preform into the center of the blow mold or to release the preform from the gripper to prevent damage, and/or to open the gripper without collision. Thus, in the running operation, the misalignment between the center of the preform and the blow mold can be compensated, for example also in case of a change of the machine performance, and/or in case of the stretching rod remaining in the opened blow mold due to a failure, a collision between the preform and the stretching rod, or other incorrect positions of parts of a blow molding station due to a failure, can be avoided by simply ejecting the preform. As an accompanying measure, the gripper can then remain actuated in the release position to avoid a collision of the gripper claws themselves.

In another embodiment of the container treatment machine, at least one gripper claw can be actuated in the opening direction into the release position or beyond the latter during a transfer or in absence of a preform, or for sorting out and ejecting a preform, for example to prevent damages, when or before a respective transition point is reached, this actuation being performed by routine or due to a sensor signal indicating a demand, or by a control routine. This can be suitable in a transfer starwheel which accepts preforms from holding arbors from a heating module and transfers them to a blow mold, for example to prevent a collision with the holding arbor when no preform is present or the holding arbor is empty, respectively.

In a further suitable embodiment of a container treatment machine, in a transfer region from one transport section to another one, the gripper claws of a gripper are arranged in a running level which is offset in the vertical direction with respect to the running level of the gripper claws of a gripper of the other transport section. The gripper claws of the one gripper are, for example, applied at the upper side of a supporting ring or securing ring in the mouth region of the preform or container, while the gripper claws of the other gripper of the other transport section are applied at the bottom side of the supporting ring or securing ring while the transfer is being performed. In order not to allow forces causing deformation to be exerted by the gripper claws during transfer, and to prevent excessive frictional loads resulting from the relative rotary motions from being exerted, during transfer, at least one gripper claw, preferably a gripper claw advancing in the direction of transport, of one gripper each is individually actuated into the opening direction to a passive position excluding rotary friction at the preform or container during transfer. This individual actuation of the gripper claws at least of the gripper in one of the two transport sections is thus utilized to increase the quality of the end product. This actuation of the at least one gripper claw relative to the holder is suitably systematically performed in each transfer, but does not have any disadvantageous effect on the proper positioning of the preform or container during the transfer because at any time, at least two further gripper claws, or even three gripper claws, remain engaged.

In another preferred embodiment of a container treatment machine, in a transfer region from one transport section to another one, the gripper claws of the grippers of both transport sections are arranged in a common running level. The gripper claws are thus applied either at the support ring or the securing ring, or else at the thread of the preform or container at the same level. In order to avoid collisions between the gripper claws or undesired frictional forces during transfer, via the control, each gripper claw can be actuated individually relative to the holders into and opposite to the direction of transport, such that the preform or container does not become completely disengaged at any time, but has just as many contact points with the active gripper claws that its position remains secured during transfer. This is particularly suitable in case of preforms or containers with very low threads or without support ring, as it corresponds to a modern tendency especially with plastic containers (PET bottles).

This embodiment is in particular suited for a transport section comprising a meandering transport path for the containers, wherein the containers are transferred from a transport carousel or transfer starwheel with several grippers arranged at the periphery to an essentially similar transport carousel or transfer starwheel. In the transfer in a common running level of the gripper claws, in particular no punctual transfer takes place, as it is common in prior art, but the transfer of the container or preform is extended to a region which covers in particular more than 3°, preferably more than 6° of a revolution of a rotating transfer starwheel. With common transfer starwheel diameters, thus ranges of a length of more than 2.5 cm, preferably more than 5.0 cm, result. The transfer region can even be adjusted to more than about 10.0 cm. In particular, both gripper claws of the transfer gripper are swiveled at the transfer starwheel in the same direction (in the direction of transport forward or backward) in the transfer. In the extended delivery/acceptance, a temporary rolling of the container or preform between the lagging gripper claw of the delivering gripper and the advancing gripper claw of the accepting gripper can suitably occur. Advantageously, the container can be in contact with only one gripper claw of the delivering gripper and one gripper claw of the accepting gripper at least at one point in time within the extended transfer region.

In the transfer in one level, in particular at least one gripper claw (in particular the one advancing in the direction of transport in an advancing swivel of the gripper claws of the transfer gripper in the direction of transport, or the gripper claw lagging in a swivel of the gripper claws of the transfer gripper opposite to the direction of transport) of the accepting gripper is positioned such that this gripper claw contacts the container with its inner surface between the gripper claws of the delivering gripper, seen in the gripping direction. Since a proper mounting of the container by a gripper claw of the delivering gripper and a gripper claw of the accepting gripper is ensured, the second gripper claw of the delivering gripper can be swiveled away. By swiveling the gripper claws holding the container into the same direction, space is provided for the other gripper claw of the accepting gripper which then is to be brought into contact with the container, until finally both gripper claws of the accepting gripper are exclusively in contact with the container.

Finally, in a further important embodiment of a container treatment machine, it is suitable if in a station of a sterilizer or rinser of a sterilizing or rinsing agent inlet nozzle e.g. for the mouth opening rim of a preform or container, the opening rim can be positioned or moved while aligning the mouth to the inlet nozzle, by the gripper with the gripper claws being in the gripping position. Here, by means of the gripper, the position of the opening rim relative to the inlet nozzle can be changed by the drive by individual or separate actuation of the gripper claws relative to the holder, while maintaining the gripping position. In this manner, the sterilizing or rinsing effect can be intensified because the inner wall of the preform or container is moved relative to the jet of the agent and is better acted upon, and the covering effect of a positioning web, if it is present, against the all-over application of the agent is compensated by the gripper, so that the complete opening rim is properly treated. Furthermore, a deflection bell can be provided for agent exiting again from the mouth to also treat the thread externally. For the thread, too, the effect can be intensified, so that a high degree of cleaning can be achieved with less sterilizing or rinsing agent. Thanks to the individual actuation of the gripper claws, it is even suitable to temporarily expose e.g. even points for the application of the agent which contact the gripper claws in the holding position. For example, this could be realized by telescopically extending a gripper claw with a frictional rotation of the container or preform about its longitudinal axis. A rotation or a temporary holding by other means while the gripper claws of the gripper are temporarily actuated to come out of contact could be suitably accomplished by another, independent contact element which holds the preform or container independently of the temporarily released gripper claws.

Thus, in one aspect the present disclosure includes a container treatment machine, a stretch-blow molding machine, a preform transport section, a filler, a labeling machine, a sterilizer, a rinser, a transport buffer.

BRIEF DESCRIPTION OF THE DRAWINGS

With reference to the drawings, embodiments of the subject matter of the disclosure are illustrated. In the drawings:

FIG. 4 shows a schematic representation of, for example, the gripper of FIGS. 2 and 3 in an arrangement in a clean room, FIG. 5 shows the gripper of FIG. 4 (analogously to FIG. 3) in a vertical section in the clean room, FIG. 6 shows a plan view of a further embodiment of a gripper, FIG. 7 shows a further embodiment of a gripper, FIG. 8 shows a plan view of the gripper, for example of FIG. 2, with an asymmetric actuation of a gripper claw, FIG. 9 shows a plan view onto another embodiment of a gripper of a symmetric cam known per se, FIG. 10 shows detail variants of asymmetric cams, for example of a kit to be selectively used with the gripper of FIG. 9, FIG. 29 shows a preform preferential heating process for the manufacture of an oval container.

DETAILED DESCRIPTION OF THE PREFERRED EMBODIMENT

Figure 1:
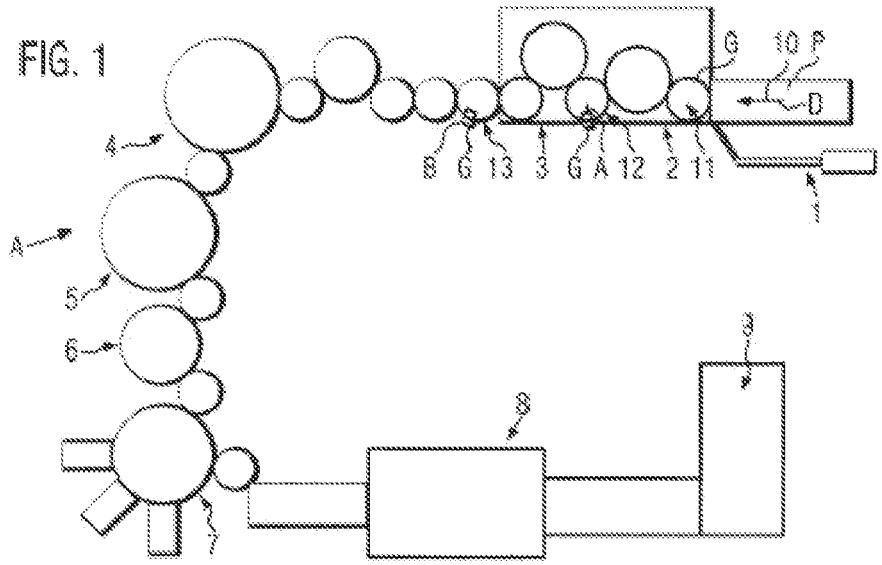
FIG. 1 shows a schematic plan view of a container treatment plant with several container treatment machines and transport sections as a non-restrictive embodiment.
Figure 30:
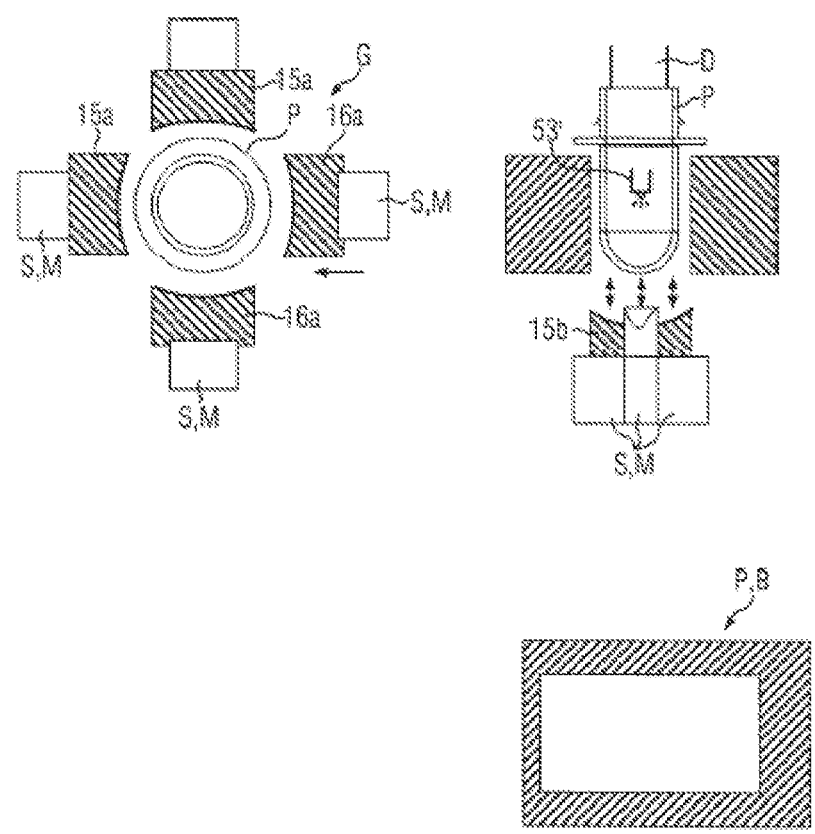
FIG. 30 shows a preform preferential heating process for the manufacture of a square container.

A container treatment plant A represented in FIG. 1 as a non-restricting example comprises a transport section 10 for preforms P as a part of a heating module 1 in which the preforms P are transported, for example, at holding arbors D or internal grippers to a further transport section 11 defined by a transfer starwheel, for example in an intermediate module 2 in which (optionally) the preforms P are subjected to a preferential heating process (see FIGS. 29, 30). In the process, they are contacted with temperature-control contact elements acting as gripper claws to apply a temperature profile varying e.g. in the circumferential direction. This is followed by a blow module as a further container treatment machine 3 in which a transfer starwheel 12 transfers the temperature-controlled preforms into split blow molds with transfer arms A and grippers G under pitch distortion compensation. The blow-molded or stretch-blow molded containers B are then transported via transfer starwheels 13 defining a further transport section to a further container treatment machine in the form of a sterilizer (optional), sterilized therein, and transferred to a rinser 4. This is followed by a filler 5 via a transfer starwheel, and then, via a further transfer starwheel with grippers, by a closer 6 from which the filled containers B are supplied via a further transfer starwheel to a labeling machine 7, and from there are linearly supplied, for example, via a transport device not pointed out more in detail to a further container treatment machine 8 in the form of a packer which is followed by a palletizer 9 via a further transport section. The respective container treatment machine 1, 2, 3, 4, 5, 6, 7, 8, 9 could be also installed and operated in a stand-alone operation with a corresponding transport section 10, 11, 12, 13 and the like, wherein at least one of the transport sections 11, 12, 13 is equipped with grippers G (controlled or uncontrolled) which are compulsorily moved in predetermined paths and each accept, transport and deliver one preform P or container B. The transport sections 11, 12, 13 are here designed like meanders. Buffer sections, such as air transporters, also suitably equipped with grippers G, which are also comprised by the disclosure, are not represented. Furthermore, the container treatment plant A could comprise, as an alternative or in addition, a coating machine, a laser cutting machine for manufacturing PET cans, container body gripper transport sections, direct printing units and the like, where also transport sections with grippers G are provided. The starwheel of the transport section 11 can be e.g. a reduction starwheel. The transfer of the containers B from the blow molding machine 3 to further treatment modules 4 can be performed, instead of with transfer starwheels 13, with a non-depicted air transporter.

In the respective inventive gripper G, by an individual actuation of gripper claws 15, 16 of the gripper relative to a holder 14, an additional degree of freedom is given which can be utilized in the container treatment to prevent damages and/or improve quality. In a method for the heat treatment of a preform, for example, in the intermediate module 2 in FIG. 1 in the preferential heating process, the contact of the preform P with contact elements which act as gripper claws 15a, 15b, 16a of a gripper G (FIGS. 29, 30) could be controlled individually. In the preferential heating mode, the contact of the preform P between the contact elements is controlled while maintaining the gripping position of the gripper G relative to the respective holder 14 or holding arbor D. For this, a signal of a sensor 53' can be preferably used which measures the temperatures at the preform inside and/or outside. The actuation of the gripper claws 15, 16 is suitably controlled depending on the path and/or force, for example in adaptation to the type of container or preform or its individually required deformation or squeezing.

In this manner, not only the degree of squeezing of the preform wall by the respective contact element is sensitively controlled, but also the reaction force resulting from the contact with the contact element at the holding arbor D acting in the mouth region of the preform. It is possible to individually and/or separately actuate only one or each contact element 15a, 15b in FIGS. 29, 30. The contact elements can be even embodied in one piece and/or individually and/or separately actuated by a common mechanism, in particular the respective parts of a contact element each lying on one side of the preform P.

In accepting a preform P from a holding arbor D, for example of the heat treatment section 10 in FIG. 1, the gripper claws 15, 16 of the uncontrolled gripper G to be preferably opened by the preform are, before the acceptance of the preform P from the holding arbor D, individually, i.e. depending on the situation, actuated by routine (programmed or detected in a control) or as required (by employing a detection sensor which detects and evaluates the situation at the holding arbor D). This security function of the gripper G would be normally unnecessary for the normal operation, but it serves preemptive prevention of damages in case a holding arbor D does not supply a preform P, which can have different, operational or optionally not foreseeable reasons. The control of the drive of at least one gripper claw can be informed that no preform P is supplied on a certain holding arbor D. For example, the entry barrier for preforms to the entrance into the heat treatment section 10 could have been closed, of which the control is informed, so that it knows that no more preforms P are to be taken as of a certain holding arbor D. Then, the gripper claws could be put to the release position, or even beyond it. In this manner, no malfunctions or damages occur in the absence of a preform P, in particular in a case where a preform P has, following modern tendencies of saving material for the preforms, such a low thread that the holding arbor D interferes down to the level of the trajectory of the gripper claws 15, 16. Here, it can be very advantageous to realize the evaluation directly via a path- and force-controlled actuation of the gripper claws. The gripper claws 15, 16 are e.g. path-controlled into the position where the preform P is normally located and would be gripped. At this position, one switches to force control. If the control of the drive of the gripper claws identifies that no more holding force is building up, this confirms that there is no preform P on the holding arbor D. The gripper claws 15, 16 are then no longer supplied for accepting the preform. Suitably, the gripper claws are even moved to the opposite direction, i.e. further in the opening direction, to more reliably avoid a collision between the holding arbor and the gripper claws. The angle or path of the gripper claws to be covered in the path-control depends on the preform and can be previously entered into the control by the user. It is also possible to detect and evaluate or convert this angle or path by an in particular optical detection sensor.

Figure 2:
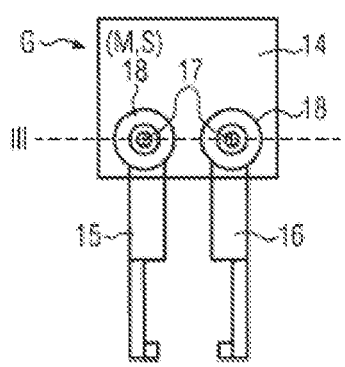
FIG. 2 shows a plan view onto an embodiment of a gripper that can be used in the container treatment plant of FIG. 1.

The gripper G of the embodiment of FIG. 2 comprises a holder 14 which is compulsorily moved along the transport section and comprises, in the shown embodiment, two gripper claws 15, 16 swiveling about swivel axes 17 at the holder 14. Each gripper claw 15, 16 (three or more gripper claws could also be provided) has a separate drive 18, that is either a magnetic drive M or an electric drive (servomotor S) which can be activated by a non-depicted control and actuate the gripper claws 15, 16 (at least one of the gripper claws) individually and/or separately about the swivel axis 17. The drives 18 shown in FIG. 2 are installed at the holder 14 and are supplied with electric energy via non-depicted connection lines to actuate the gripper claws 15, 16. The mentioned electric drive and also electric drives mentioned in further embodiments of grippers G could be embodied as piezoelectric drives.

The at least third gripper claw (not shown) can not only be used, thanks to its individual actuation, to more exactly position the preform P or container B in the gripping position, but also to individually displace, e.g. shift, the preform P or container B held by two gripper claws 15, 16 relative to these two gripper claws 15, 16. Here, the two gripper claws can be actuated by a common drive, while the at least third gripper claw is actuated by means of a separate drive. Thus, for example a desired central position of preforms which, for example, have different diameters can be adjusted as required in case of a change of types.

Figure 3:
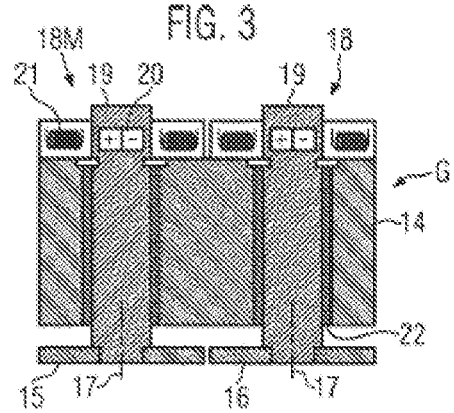
FIG. 3 shows a vertical section of the gripper of FIG. 2.

FIG. 3 shows, in a vertical section, the block- or plate-like holder 1 in which, via plastic guide bushes 22, one shaft 19 each is mounted to rotate about the swivel axis 17 and supports a gripper claw 15, 16 at the lower end. In the upper end of each shaft 19, two inversely polarized permanent magnets 20 are arranged to which magnet coils 21 installed at the holder 14 are oriented, namely in the embodiment in FIG. 3 two, for example diametrically opposed, magnet coils 21 per shaft 19.

In FIGS. 2 and 3, it is a controlled gripper G whose gripper claws 15, 16 can be directly individually and/or separately actuated by the magnetic drives 18, M relative to the holder 14, for example to adjust the defined gripping position shown in FIG. 2, or to spread apart the gripper claws 15, 16 into a non-depicted defined release position, either symmetrically or asymmetrically, as required. In particular, the drive 18, M is a controllable direct drive with a plurality of coils which are each attached at or near the periphery of the shaft 19.

In FIGS. 4 and 5, for example, the gripper of FIGS. 2 and 3 with its gripper claws 15, 16 and a preform gripped by them is arranged in a clean room R, wherein a clean room boundary wall 23 seals between the holder 14 and the gripper claws 15, 16. Further hydraulic seals 24 are arranged, for example, between a rotary part of the clean room R and a stationary part (for example a hydraulic seal or a so-called "surge tank").

FIG. 5 illustrates that the boundary wall 23 acts with sealing rings 25 at the shafts 19 of the two gripper claws 15, 16 in a sealing manner, so that the holder 14 is placed with the two drives 18 outside the clean room R, and the gripper claws 15, 16 work in the clean room R.

FIG. 6 illustrates a further embodiment of a gripper G with two gripper claws 15, 16 at the holder 14 that can be swiveled, wherein a common drive 18, here a magnetic drive M, for the gripper claws 15, 16 is installed at the holder 14. At one gripper claw extension each beyond the swivel axis 17, two inversely polarized permanent magnets 20 are arranged which magnetically cooperate with an inserted magnet coil 21 to adjust the gripper claws 15, 16 individually and/or separately by swiveling. Here, the arrangement of the inversely polarized permanent magnets 20 can be made such that they also act upon the gripper claws 15, 16 (in the opening direction) like a magnetic spring, here in the closing direction. As an alternative (which is not shown), another energy storage mechanism, such as a mechanical spring, can be arranged between the gripper claws 15, 16 or the gripper claw extensions, which pretensions the gripper claws 15, 16 in the closing direction. The swivel axes 17 of the gripper claws 15, 16 are approximately spaced apart to such an extent that the gripper claws 15, 16 are essentially in parallel with each other in the exemplary gripping position in FIG. 6, but are spread apart like scissors in the non-depicted release position. Although in FIG. 6, the gripper could be basically an uncontrolled gripper G, it is, by the influence of the drives 18, M, a controlled gripper at least in certain operational phases.

In the embodiment in FIG. 7, a magnet coil 21 is allocated to each gripper claw 15, 16 at the holder 14 of the gripper G, the magnet coil cooperating with the two inversely polarized permanent magnets 20 in each gripper claw extension to selectively actuate the gripper claws 15, 16 symmetrically or individually and/or separately. The arrangement of the permanent magnets 20 in FIG. 7 is selected, for example, such that the inversely polarized permanent magnets facing each other repel each other in the two gripper claws 15, 16 (indicated by a positive sign) and so to speak act as a magnetic closing spring of the gripper G.

FIG. 8 shows, for example, the gripper G of FIG. 2 with the drives 18 (magnetic drive M or with servomotors S) here embodied as direct drives in an operational phase in which only the right gripper claw 16 is asymmetrically actuated to the outside.

The embodiment of the gripper G in FIG. 9 comprises, at the holder 14 of the gripper claws 15, 16 swiveling about their spaced apart swivel axes 17 (basically uncontrolled gripper G either with the magnetic closing spring 20' defined by the permanent magnets 20 and/or with a mechanical or plastic closing spring 20"), for both gripper claws 15, 16 a common drive in the form of an electric servomotor 26 (S) which is installed for rotatably driving a symmetric cam 28 at the holder known per se. Here, a toothed gearing (toothing 27, 29 at the servomotor 26 and the cam 28) is provided to rotate the cam 28 in the one or the other sense of rotation and actuate the gripper claws 15, 16 relative to the holder 14 via the gripper claw extension differently from each other, namely by the changing distances of the points of application of cam elevations 30, 31 of the symmetric cam 28 in FIG. 9 (the cam elevations 30, 31 are diametrically opposed and have, for example, the same height and/or different heights). When the cam 28 is rotated, the two gripper claws 15, 16 are swiveled about the swivel axes 17 relative to the holder 14 nearly symmetrically (depending on the sense of rotation of the cam 28), but by different swivel angles.

FIG. 10 illustrates a kit of different asymmetric cams 28 which can be used, for example, instead of the symmetric cam 28 of FIG. 9 known per se. In FIG. 10, three asymmetric cams 28 are indicated as examples whose cam elevations 30, 31 are oriented either rotationally offset and/or differently with respect to the axis of revolution, and/or which have different heights to actuate the gripper claws 15, 16, by different swivel angles in a rotation by the servomotor 26. Instead of cam elevations 30, 31, cam indentations can be provided to swivel the gripper claws 15, 16 e.g. in the same directions.

Figure 11:
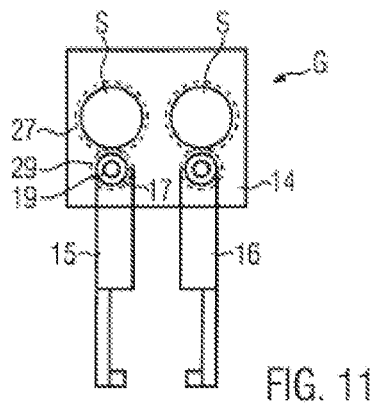
FIG. 11 shows another embodiment of a gripper in a plan view.

In the embodiment of the gripper G in FIG. 11, two electric servomotors S (suitably force- and/or path-controlled, that means controllable) are installed at the holder 14 and can adjust, via the toothing 27, 29, the shafts 19 of the two gripper claws 15, 16 symmetrically as well as individually and/or separately. The two servomotors S are installed next to each other in the holder 14, for example at the distance of the swivel axes 17. The toothing acts at the shafts 19 at the same level.

Figure 12:
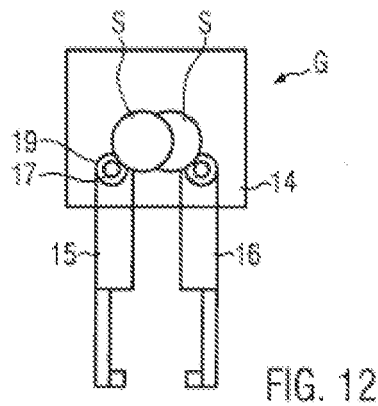
FIG. 12 shows another embodiment of a gripper in a plan view.

In the embodiment of the gripper G in FIG. 12, there are also two electric servomotors S installed at the holder 14, one for one gripper claw 15, 16 each, which, however, are placed such that they are superimposed one upon the other for space reasons. In variation to the representation in FIG. 12, the servomotors S can be arranged completely one upon the other and act with their toothing at different levels at the shafts 19, so that installation space is saved and the two servomotors S can be optionally even placed between the swivel axes 17. This arrangement principle of the servomotors S could also be selected with direct drives.

Figure 13:
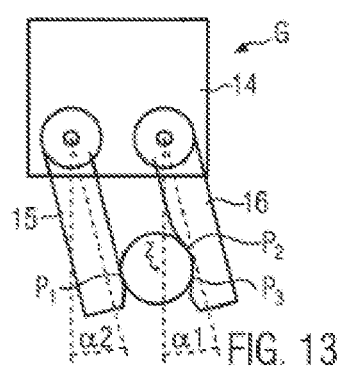
FIG. 13 shows a further embodiment of a gripper in an operating position.

In the embodiment of the gripper G in FIG. 13, the two gripper claws 15, 16 are shown which retain a preform P or a container B in the gripping position (a three-point holder with points of application P1, P2, P3, either at the thread of the mouth, or at the securing ring or at the supporting ring, or else at the outer wall of a container B is shown), wherein a center Z of the preform P or container B is offset to the side by actuating the two gripper claws 15, 16 in the same direction via different swivel angles $\alpha_1$, $\alpha_2$ relative to the holder 14 and with respect to the normal position (corresponding to FIG. 11 or 12). The swivel angle $\alpha_1$ is larger than the swivel angle $\alpha_2$ to maintain the gripping position and also in order not to change the gripping force. However, in this displacement, the center Z of the preform P or container B has been displaced to be somewhat closer to the holder 14 than in the central gripping position, for example of FIG. 11 or 12. If this could lead to a problem in a transfer, other measures must be taken to compensate or even overcompensate this approximation, which will be illustrated later.

Figure 14:
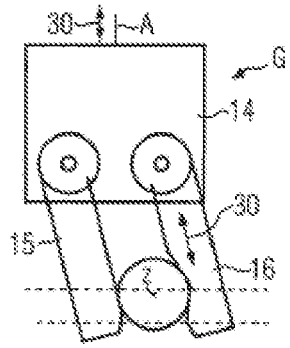
FIG. 14 shows a further embodiment of a gripper in a plan view, wherein two different detail variations are indicated.

FIG. 14 shows a gripper G of a further embodiment, however analogously to FIG. 13, wherein the holder 14 is arranged, for example, at a transfer arm A which can be adjusted by means of a symbolically indicated linear drive 30 in the direction of a double arrow to compensate or even overcompensate the approximation of the center Z to the holder 14 occurring in the individual and/or separate actuation of the two gripper claws 16, 15, while maintaining the gripping position, that means to move the center Z downwards. As an alternative or in addition to the linear drive 30, a linear drive 30 can also be provided for at least one gripper claw, here the gripper claw 16, which is embodied to be telescopic in the longitudinal direction. Of course, both gripper claws 15, 16 can be telescopic and equipped with linear drives 30. For the linear drives 30, magnetic drives M or electric servomotors S offer themselves.

Figure 15:
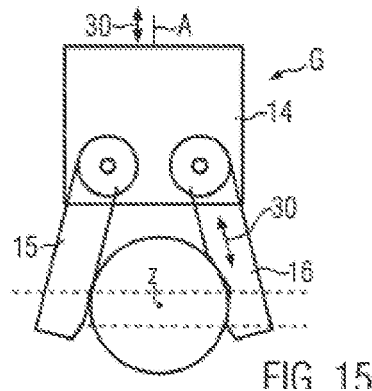
FIG. 15 shows by way of example the gripper of FIG. 14 in another operating position after a change of types.

The gripper G in FIG. 15 is, for example, arranged at a transfer arm A which can adjust the holder 14 in the direction of the double arrow by the linear drive 30 (and optionally even by rotation) to bring the center Z of a preform P or container B into a desired position. The drives, or one common drive, of the gripper claws 15, 16 not pointed out in FIG. 15 can be individually adjusted for different types of preforms P or containers B via a programming or adjustment of the control of the gripper G. Thus, differently wide gripping positions, gripping force profiles and the like can be selected and retrieved via the control S in case of a change of types.

Figure 16:
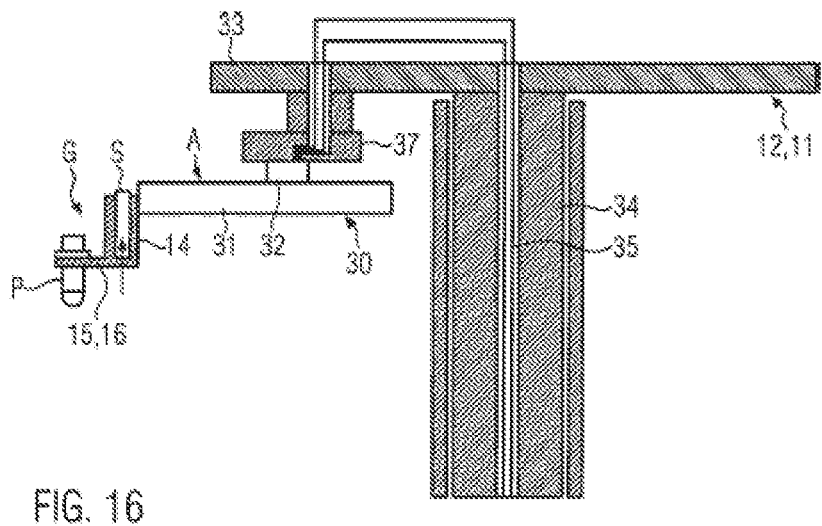
FIG. 16 shows a schematic vertical section of a transfer or reduction starwheel with a represented gripper.

FIG. 16 schematically illustrates a transfer starwheel 11, 12 with a transfer arm A which is stationarily mounted at the bottom side at a rotatably driven disk 33. The disk 33 is seated on a rotatably driven column 34 in the inside of which a channel for electric supply lines 35 for the at least one servomotor S of the gripper G and the linear drive 30 of the transfer arm A is accommodated. At a here stationary support 37, the linear drive 30 comprises a stationary stator 32 and an inductor 31 linearly movable relative to it at which the holder 14 of the gripper G is mounted. In the gripper G, a gripped preform P is indicated. In this manner, a (small) pitch distortion could be realized, for example, by swiveling the gripper claws 15, 16 into the same direction and extending the linearly movable inductor 31.

Figure 17:
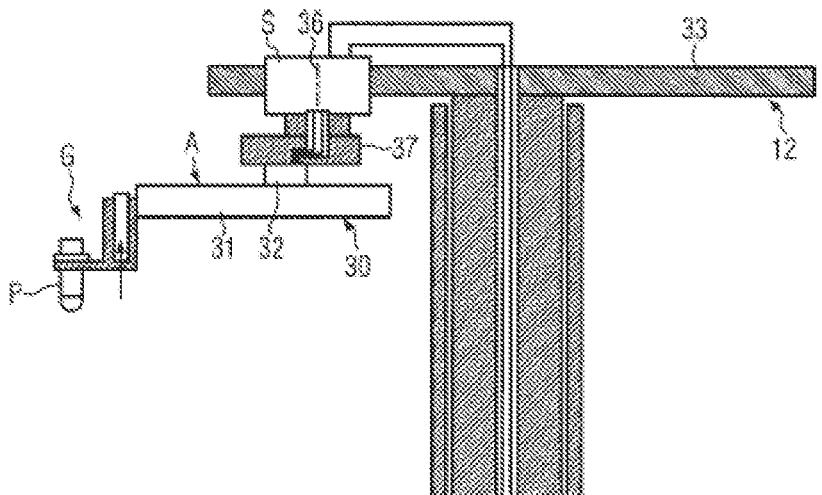
FIG. 17 shows a vertical section of another embodiment of a transfer or reduction starwheel with a represented gripper.

In the embodiment of a transfer starwheel 12 in FIG. 17 with pitch distortion compensation, the transfer arm A, which supports the holder 14 of the gripper G and comprises the linear drive 30 with the inductor 31 and the stator 32, is mounted at the support 37, which is here rotatable about the axis 36 in the disk 33. The support 37 is electrically rotated, for example by a servomotor S, to change the distance between the preforms P in the grippers G and their distances from the axis of revolution of the disk 33 as required. In addition, as in FIG. 16, the preform P can be repositioned, for example analogously to FIG. 13 or 14, relative to the holder 14 by individual and/or separate actuation of the gripper claws 15, 16 relative to the holder, while maintaining the gripping position.

Figure 18:
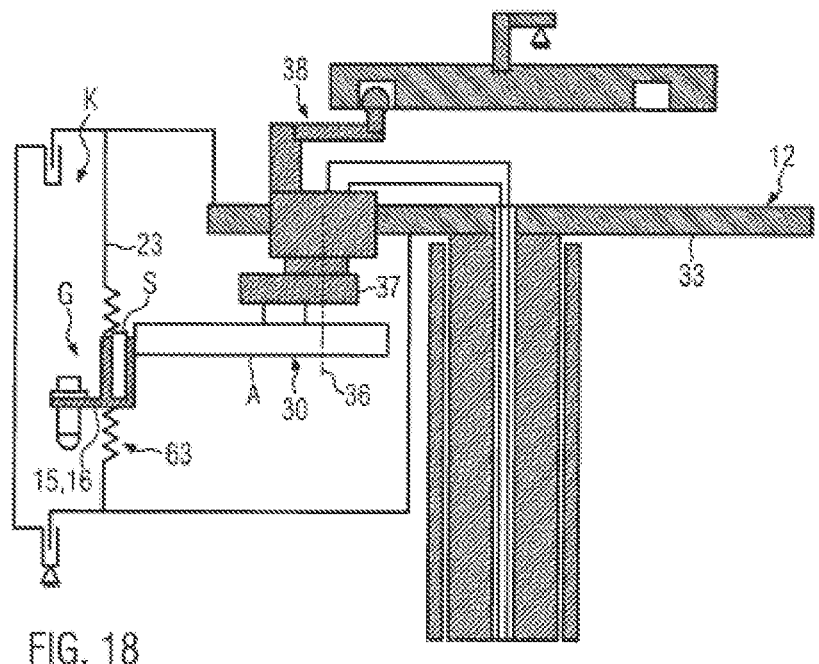
FIG. 18 shows a vertical section of a further embodiment of a transfer or reduction starwheel with a represented gripper in a clean room.

FIG. 18 indicates a transfer starwheel 12 with pitch distortion compensation in a hybrid solution and in connection with a clean room R. The respective gripper G, for example for preforms, is seated at the transfer arm A with the linear drive 30, wherein the transfer arm A can also be swiveled about the axis of revolution 36 with the support 37 rotatably mounted in the disk 33. Here, a conventional curved path control 38 with a stationary curved path is indicated which, with the rotary motion of the disk 33, controls the rotation of the support 37 about the axis 36, while the transfer arm A allows to change the distance of the center of the retained preform from the axis of the transfer starwheel 12, and the individual and/or separate actuation of the gripper claws 15, 16 also permit the repositioning of the retained preform P while maintaining the gripping position. The clean room R, in which the gripper claws 15, 16 move, is sealed with its clean room boundary wall 23, for example, by bellows 63 at the gripper G, so that the curved path control 38 remains placed outside. All drives (curved path control 38, linear drive 30, gripper drive) are arranged outside the clean room R.

Figure 19:
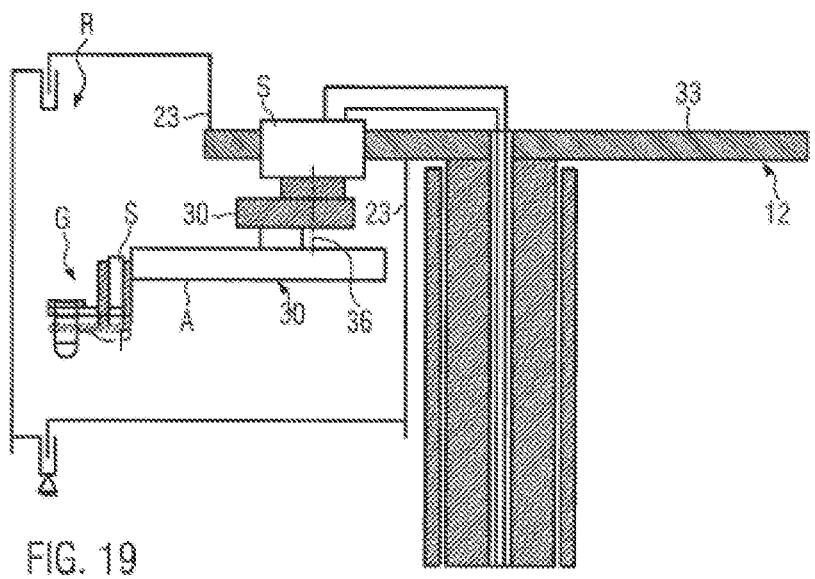
FIG. 19 shows the transfer or reduction starwheel of FIG. 17 when incorporated in a clean room.

FIG. 19 illustrates an embodiment of a transfer starwheel 12 analogously to FIG. 17 also in a clean room, wherein the clean room boundary wall 23 is sealed at the disk 33, so that the gripper G with its servomotor S and the transfer arm A with its linear drive 30 and the support 37 with a portion of its servomotor S are located in the clean room R, which, however, does not represent any disadvantage as in the clean room R, no hygienically critical curved path controls are required.

Figure 20:
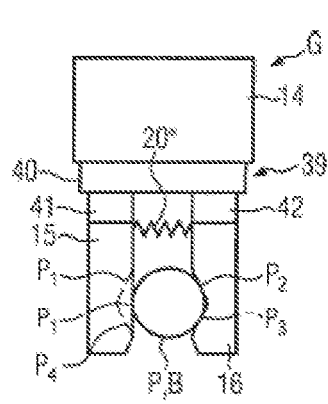
FIG. 20 shows another embodiment of a gripper.

FIG. 20 illustrates a further embodiment of a gripper G whose gripper claws 15, 16—here for example two—can be individually and/or separately actuated in parallel to themselves and linearly relative to the holder 14, either symmetrically relative to the holder 14 or towards each other or away from each other, or together asymmetrically with respect to the holder 14 in the one or other linear direction. At the holder 14, a linear drive 39, for example a magnetic drive or a servomotor, is arranged and comprises a stationary stator 40 and two linear inductors 41, 42 in the latter, each of them supporting a gripper claw 15, 16. Optionally, a spring 20' (e.g. a tension spring) is provided and acts upon the gripper claws 15, 16 in the closing direction. Depending on which behavior is desired in case of a mains failure, the spring 20' could be a pressure spring acting in the opening direction.

In solid lines in FIG. 20, the gripper claws 15, 16 define a three-point holder with points P1, P2, P3 for the preform P or container B. As an alternative, a, for example, symmetrical four-point holder with four points P1 to P4 is indicated, which does not generate any rotational frictional forces laterally relative to the holder 14 at it here thanks to the linear and parallel actuation of the gripper claws 15, 16 in a displacement of the preform P or container B.

The holder 14 can be attached to a transfer arm A and adjusted by a linear drive 30, for example as in FIG. 14. As an alternative, the two gripper claws 15, 16 could be telescopic in the longitudinal direction and each comprise separate linear drives for telescoping to be able to displace the center of the gripped preform P or container B also perpendicularly to the holder 14.

Figure 21:
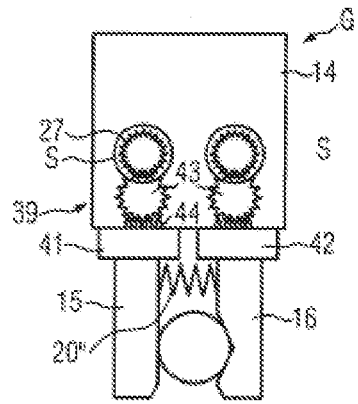
FIG. 21 shows another embodiment of a gripper in a plan view.

FIG. 21 shows, at inductors 41, 42 of the linear drive 39, a gripper G with two gripper claws 15, 16 adjustable in parallel to themselves and linearly, the linear drive here comprising two servomotors S with a toothing 27, and a toothed gearing each with toothed gearwheels 43 and a toothed rack profile 44 for actuating the inductors 41, 42. The gearwheels 43 or toothing 27, 44 can consist of plastic, be self-lubricating and therefore also be hygienically used in a clean room atmosphere. The toothed gearings could be encapsulated. A closing spring 20" is also conceivable. The two gripper claws 15, 16 cannot only be actuated symmetrically to the holder 14, but also individually and/or separately from each other.

Figure 22:
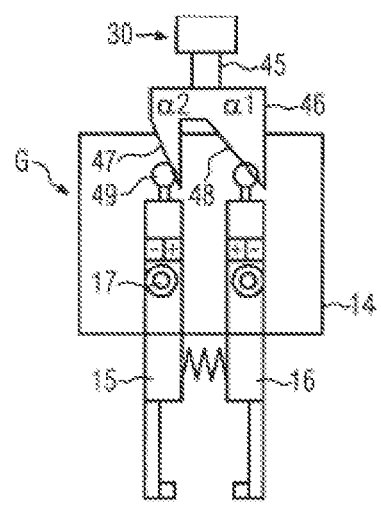
FIG. 22 shows another embodiment of a gripper in a plan view, FIG. 23 schematically shows in a plan view a transfer operation and a procedure between a reduction starwheel with a represented gripper and a split blow mold at a blow-molding unit.

FIG. 22 illustrates another embodiment of a gripper G with two gripper claws 15, 16 that can be actuated to swivel about their swivel axes 17, a mechanical or magnetic closing spring, a linear drive 30, for example with a servomotor S, being arranged at the holder 14, which adjusts a double cam 46 of a cam drive relative to the holder 14 via an actuator 45 in the direction of the double arrow to actuate the two gripper claws 15, 16 individually and/or separately from each other by differently large swivel angles α1, α2, as is required for maintaining the gripping position. The double cam 46 comprises two cam faces 47, 48 with different slopes (which define the different swivel angles α1, α2) at which cam follower elements 49 are here applied at gripper claw extensions.

Figure 23:
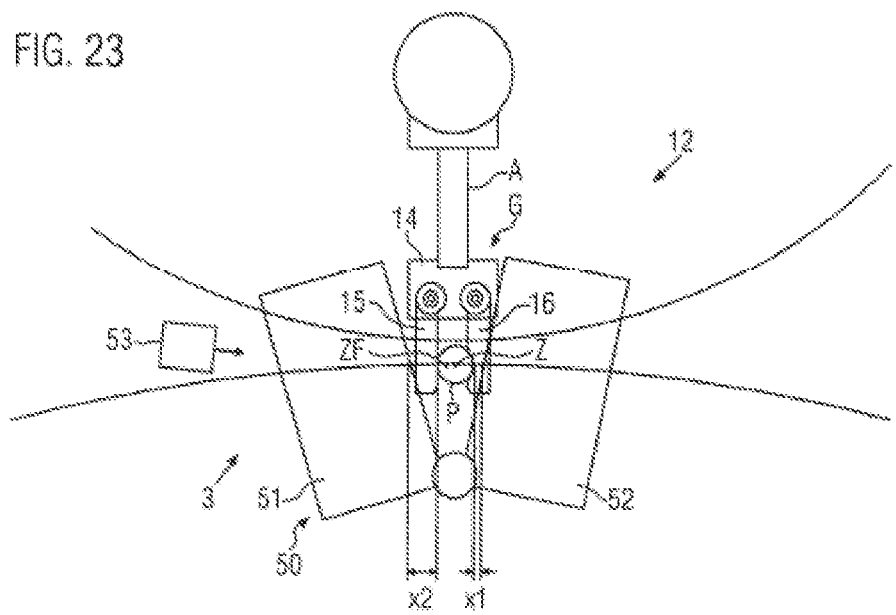

FIG. 23 shows, by way of example and using the gripper G of FIG. 13, a transfer situation between a transfer starwheel with a pitch distortion compensation and a blow molding station at a blow-molding unit 3 with a shown preform P held by several split blow molds 50 before the transfer of the preform held in the gripping position between the gripper claws 15, 16. The job of the transfer starwheel 12 is to transport the center Z of the preform P at least over a predetermined distance in synchronism with a center ZF of the blow mold 50 until the blow mold is closed and pulls the preform, which is then positioned in the blow mold 50, out of the gripper G, or the gripper releases the latter by being readjusted to the release position. A sensor array 53, for example a camera or a proximity initiator, measures the relative position between the center Z of the preform P and the center ZF of the blow mold 50, or the distances x1, x2 of the preform mouth from the mold halves 51, 52. In the represented transfer situation, there is a misalignment (x1-x2) between the center Z and the center ZF, that means the preform P is closer to the mold half 52 than to the mold half 51. During the closing of the blow mold 50, this would lead to a shaking or displacement of the preform P which would forbid the proper action of a non-depicted stretching rod at the preform bottom and affect the quality of the blown container. The sensor array 53 (or an evaluation means, not shown) evaluates the detected transfer situation and supplies a correction signal to the not represented control of the drive or drives of the gripper G corresponding to a detected deviation between Z and ZF. By the individual and/or separate actuation of the gripper claws 15, 16, the deviation is then at least largely compensated, so that the preform P is introduced into the blow mold without shaking and is finally properly seated in the center ZF of the blow mold 50 after the transfer.

The individual actuation of the gripper claws 15, 16 can be generally utilized, as an alternative or in addition, in connection with at least one detection sensor for detecting the transfer situation to individually react to a failure-related incorrect position of individual parts of the blow molding station to prevent damages. For the blow molding process, usually a blow nozzle not shown in FIG. 23 is applied to the blow mold 50 and lifted again after the blow molding process. The blow mold halves 51, 52 closed and locked for the blow molding process moreover have to be unlocked and opened again after the blow molding process. Furthermore, the stretching rod is inserted into the blow mold 50 and subsequently completely retracted again for the blow molding process in stretch blow molding. Due to a failure, the blow nozzle might not have been properly lifted again, or the mold halves have not been unlocked and/or opened, or the stretching rod is at least partially still located in the blow mold when the preform P is to be introduced. These incorrect positions of parts of the blow molding station due to failures can be detected and evaluated by the at least one detection sensor 53 and then be used for the individual actuation of the gripper claws 15, 16 to avoid damages. If the blow nozzle is not lifted and/or not unlocked, or the blow mold is not opened, or the stretching rod is not properly retracted, by the individual actuation of the gripper claws 15, 16, the retained preform P is ejected and/or the gripper claws are swiveled away to avoid a collision of the preform P and/or the gripper claws 15, 16 with the parts of the blow molding station that have been incorrectly positioned due to a failure.

Figure 24:
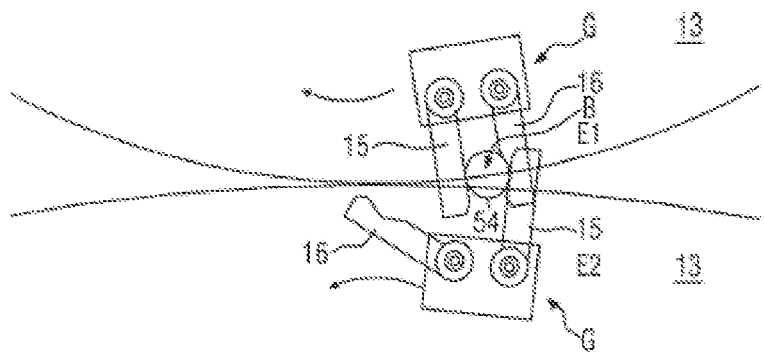
FIG. 24 shows in a plan view a transfer situation or a procedure in the transfer from one transfer starwheel to another one.

FIG. 24 indicates a transfer situation between two transfer starwheels 13 equipped with two grippers G. Here, the respective gripper claws 15, 16 are actuated individually and/or separately to carry out a smooth transfer and in the process avoid undesired frictional forces at the container B here shown by way of example. In the lower gripper G (accepting gripper), the gripper claw 16 advancing in the direction of transport is actuated in the opening direction relative to the holder 14, while the lagging gripper claw 15 of the lower gripper G is already dealing with the transfer. Subsequently, the gripper claw 16 of the lower gripper G which is swiveled outwards is swiveled back to the gripping position, while optionally the advancing gripper claw 15 of the upper gripper G (delivering gripper) is swiveled to the release position, or both gripper claws 15, 16 of the upper gripper G are swiveled to their release positions. In this way, at least one gripper claw 15, 16 of the lower gripper can be in particular actuated by force control to ensure a gentle delivery/acceptance. The gripping force of the gripper claws 15, 16 of the lower gripper G is here first set to be very weak and is increased in the region of the tangent point of the trajectories of the respectively two grippers G until finally the desired gripping force for the final removal of the container B away from the upper gripper G is reached.

In connection with FIG. 24, it should be noted that the orbits of the gripper claws 15, 16 of the cooperating grippers G are offset in the vertical direction (levels E1, E2), so that, for example, the gripper claws 15, 16 of the upper gripper act at the upper side of a supporting ring or securing ring of the container B, while the gripper claws 15, 16 of the lower gripper act at the bottom side of the supporting ring or securing ring. By the individual and/or separate actuation of the respective gripper claws, thus an extraordinarily gentle transfer is accomplished, even in a case where the container B is not gripped at the mouth, but at the periphery.

Figure 25:
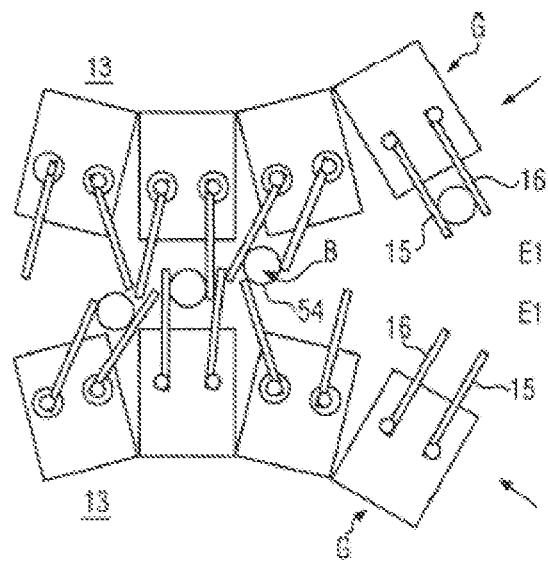
FIG. 25 shows in a plan view a transfer situation or a procedure between two transfer starwheels equipped with grippers, wherein at each transfer starwheel, one gripper is represented in several snapshots.

FIG. 25 illustrates a transfer situation for a container B between two grippers G, for example of two transfer starwheels 13. The two grippers G are represented several times in snapshots. In reality, successive grippers G of each transfer starwheel 13 are in particular further spaced apart than it is shown. By the individual and/or separate actuation of the gripper claws 15, 16 of each gripper G, a gentle transfer of the container B is also performed, that means deformations and/or frictional loads resulting from the different orbits of the motions of the gripper G are reduced. The gripper claws 15, 16 of both grippers G (delivering and accepting grippers) move in a common running level E1, i.e. in the running level E1 they act at the periphery of the container B or at the supporting ring or securing ring, respectively.

Following a current trend, containers B are often blow-molded with a very short thread 54 and optionally without supporting ring (also glass bottles), where one has to very carefully handle the thread or an optionally provided security ring. The delivering gripper G coming from the top right in FIG. 25 swivels both its gripper claws 15, 16 forward by different swivel angles, in the second representation from the right, while maintaining its gripping position and advancing in the direction of transport until the advancing gripper claw 15 has passed the end of the advancing gripper claw 16 of the accepting gripper G which is to this end also swiveled to be advancing in the direction of transport and asymmetrically into the release position or beyond the latter until an initial contact with the thread 54 or the securing ring is created. The lagging gripper claw 15 of the accepting gripper G is still in its gripping position and is, third representation from the right, individually slightly swiveled to be lagging opposite to the direction of transport after it has passed the lagging gripper claw 16 of the delivering gripper G, while the lagging gripper claw 16 of the delivering gripper G is individually swiveled opposite to the direction of transport, so that the container B is held between the advancing gripper claw 16, which is also swiveled back opposite to the direction of transport, and the gripper claw 16 of the delivering gripper G swiveled back opposite to the direction of transport. In the sequence (fourth representation from the right), the lagging gripper claw 16 of the delivering gripper G is individually swiveled further opposite to the direction of transport and withdrawn from the container B which is meanwhile held between the gripper claw 16 individually swiveled beyond the gripping position opposite to the direction of transport, and the lagging gripper claw 15 of the accepting gripper G also individually further swiveled opposite to the direction of transport. The lagging gripper claw 16 of the delivering gripper G has already disengaged from the container when both gripper claws 15, 16 of the accepting gripper G are finally actuated by different swivel angles into the normal gripping position shown in the first representation from the right, while maintaining the gripping position, and transport the gripped container B further.

With a transport section system with a meandering transport path for containers (preforms P, containers B) and a transfer of the containers from a transport carousel or transfer starwheel with several grippers G arranged at the outer periphery to an essentially similar transport section system or starwheel, one can start from the principle of the punctual transfer common in prior art, and the transfer of the container can be extended to a region which is in particular more than 3°, preferably even more than 6°, of a revolution of a circulating transfer starwheel. With common transfer starwheel diameters, thus transfer regions of a length of more than 2.5 cm, preferably even more than about 5.0 cm result. The transfer region can be even adjusted to more than about 10.0 cm thanks to the individual actuation of the gripper claws 15, 16. In particular, in the transfer, both gripper claws 15, 16 of the delivering gripper G at the transfer starwheel are swiveled together into one direction (advancing or lagging in the direction of transport). Suitably, in the extended delivery/acceptance, the container or the preform can temporarily roll between the lagging gripper claw of the delivering gripper and the advancing gripper claw of the accepting gripper. Advantageously, the container can be in contact with only one gripper claw of the delivering gripper and one gripper claw of the accepting gripper at least at one point in time within the extended transfer region.

Especially in the transfer in a common running level E1 in FIG. 25, in particular at least one gripper claw of the accepting gripper (in particular the gripper claw advancing in the direction of transport in the advancing swivel of the gripper claws of the delivering gripper in the direction of transport, or the gripper claw lagging in the direction of transport in the swivel of the gripper claws of the delivering gripper against the direction of transport) is positioned such that this gripper claw comes into contact with the container with its inner surface, seen in the gripping direction, or the gripping region between the gripper claws of the delivering gripper. Since a proper retention of the container by a gripper claw of the delivering gripper and a gripper claw of the accepting gripper is ensured, the second gripper claw of the delivering gripper can be swiveled away. By swiveling the gripper claws holding the container into the same direction, space for the other gripper claw of the accepting gripper then to be brought into contact with the container is provided, until finally both gripper claws of the accepting gripper are exclusively in contact with the container.

Figure 26:
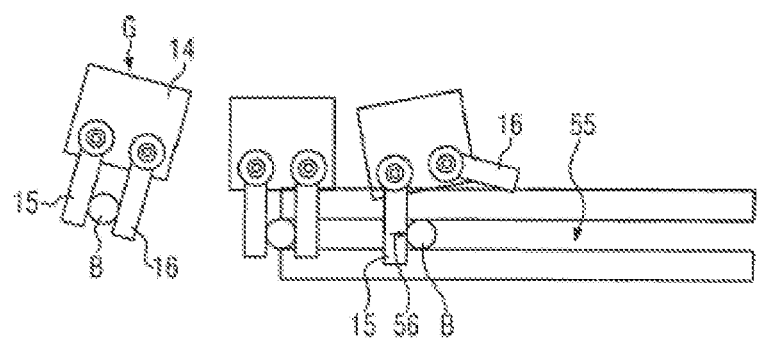
FIG. 26 shows a plan view of a transfer situation or a procedure in the transfer of containers from a gripper represented in snapshots into an air transport device.

FIG. 26 indicates a transfer situation between a gripper G, for example of a transfer starwheel, which rotates about an axis, and an air transport device 55 for containers B to be carried off. The gripper claws 15, 16 located in their normal gripping positions at the holder 14 introduce the container B into the air transport device 55, wherein initially the gripping position is maintained until not represented air nozzles have the tendency of accelerating the container, in FIG. 26 linearly to the right. Due to the bottom movement of the gripper G, first the advancing gripper claw 16 is swiveled, in the second representation from the left, into the release position, or even beyond this position (third representation from the left), while the lagging gripper claw 15 simultaneously still grips behind the container B and accelerates it (arrow 56) in the air transport device 55. During the further movement of the gripper G, the lagging gripper claw 15 is further individually adjusted in the direction of the opening movement, preferably such that the lagging gripper claw 15 grips behind the container B and accelerates it, at least largely vertically to the linear direction of acceleration of the container B, until finally the lagging gripper claw 15 moves from the meanwhile accelerated container B upwards, while maintaining its orientation perpendicular to the linear direction of motion in the air transport device 55. In the process, an additional contact element (not shown) can be provided e.g. at the gripper claw 15 which, during the acceleration, acts at the container B, e.g. at its center of gravity or above or below it, to stabilize it. This can be suitable if the container B is held by the gripper G in the mouth region.

Figure 27:
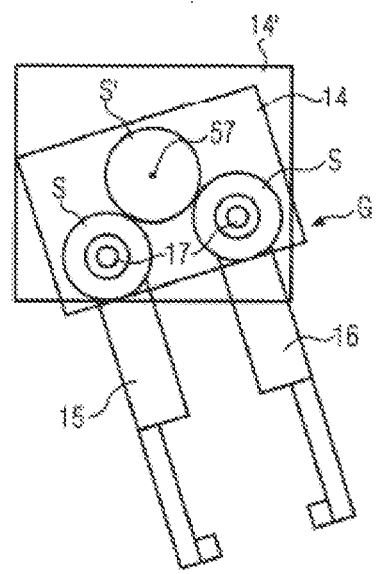
FIG. 27 shows a further embodiment of a gripper.

FIG. 27 in a plan view shows a further embodiment of a gripper G whose two gripper claws 15, 16 movable about their swivel axes 17 can be each individually and/or separately actuated relative to the holder 14 by separate servomotors S. The holder 14 is mounted at a holder support 14', for example a supporting plate or a transfer arm A, to rotate about a center of rotation 57 and can be rotated by means of a servomotor S' installed at the holder 14 or the holder support 14'. The servomotor S imparts a further individual degree of freedom for the adjusting motion to the gripper G.

Figure 28:
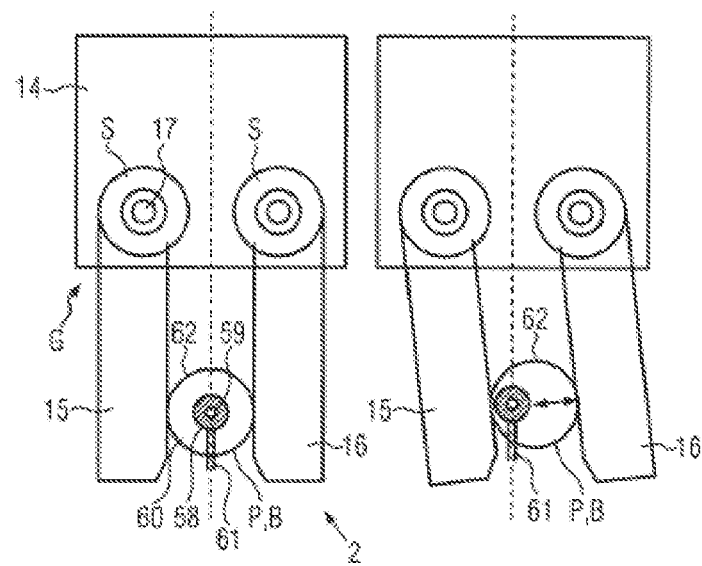
FIG. 28 shows a further embodiment of a gripper in a sterilizer in two different operating positions.
Figure 20:
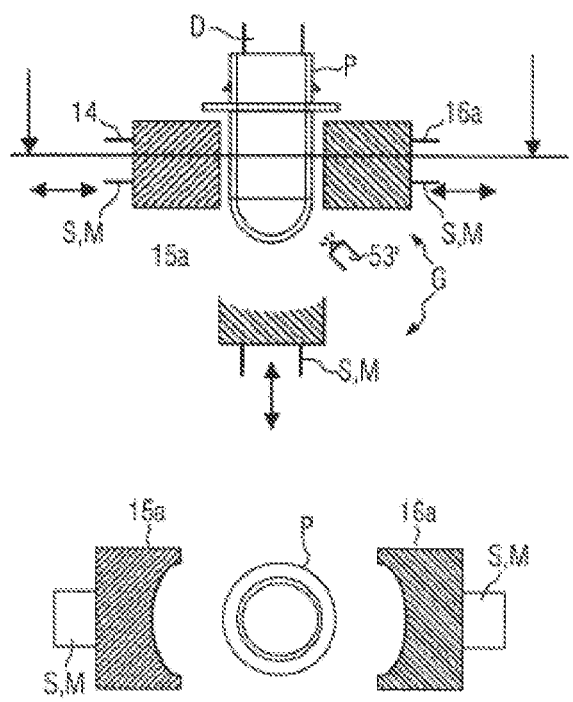

FIG. 28 shows, in two adjacent representations, a gripper G which aligns, for example in a not pointed out transport starwheel of a sterilizer or rinser 2, a preform P or container B with an inlet nozzle 58 during a cycle, which applies a sterilizing or rinsing agent, e.g. gaseous hydrogen peroxide, under pressure into the inside from a nozzle opening 59. In the left representation in FIG. 28, a mouth 60 held between the gripper claws 15, 16 located in the normal gripping position is centrically aligned with its mouth rim 62 with the inlet nozzle 58. In the process, the mouth rim 62 is optionally placed against at least one positioning web 61 holding, for example, the inlet nozzle 58. By the individual and/or separate actuation of the two gripper claws 15, 16 while maintaining the gripping position, for example by their own servomotors S at the holder 14, the mouth rim 62 is displaced, preferably several times, relative to the holder 14 according to the right-hand representation relative to the inlet nozzle 58 so that the agent can be more intensively applied to all regions of the inner wall and, if a positioning web 61 is provided, also properly treat the section of the mouth rim 62 covered by the latter. If the gripper claws 15, 16 are telescopic in the longitudinal direction, even a wobbling movement of the mouth rim 62 can be accomplished. As an alternative, the inlet nozzle 58 could be additionally also moved, for example by means of a servomotor. The gripper claws 15, 16 could be even temporarily released to be able to apply the agent also onto the gripper claw contact points. Here, the container B could be temporarily held and/or even rotated by at least one other contact element (not shown).

If, for example, in FIG. 28, a deflection bell (not shown) is provided above the inlet nozzle 58 by which agent exiting from inside the treated preform P or container B is deflected and also applied onto the thread at the outer side of the mouth 60, this region can also be treated more intensely by the change of the positions of the opening rim 62 relative to the inlet nozzle 58.

Suitably, the servomotors S of the gripper claws 15, 16 are encapsulated. The power supply of the servomotors S or the magnetic drives M of the gripper claws 15, 16 is accomplished, for example, via slip ring connections or the like (not shown).

FIGS. 29 and 30 show two non-restricting examples of preform preferential heating processes for the manufacture of noncircular containers with wall thicknesses which are, despite their non-circularity, uniform or which are different, by blow molding or stretch blow molding the preform P in a non-depicted blow molding or stretch-blow molding machine. Theoretically, this process is also suited for manufacturing round containers with varying wall thickness profiles.

The preform preferential heating process is, for example, carried out in the intermediate module 2 shown in FIG. 1 through which the preforms P are transported in the mouth region by holding arbors D or internal grippers and are brought into deforming and/or squeezing contact with shell-like contact elements acting as gripper claws 15a, 15b, 16a of a gripper also responsible for the transport and the positioning of the preform. The preform P has previously already obtained a temperature profile which is, for example, uniform in the circumferential direction. The contact elements withdraw heat and/or locally supply heat and deform the initially largely circular preform temporarily with respect to the desired noncircular container shape and/or locally differing wall thicknesses in the side wall and/or in the bottom region. This method is known per se, but to date it involves the essential disadvantage that the contact elements always grip in the same manner due to the employment of curved path controls, do not permit any individual control of the deformation and/or squeezing, and can cause relatively high reject rates.

According to the disclosure, in FIGS. 29 and 30, at least one contact element acting as a gripper claw 15a, 16a, 15b of a gripper G is individually actuated by a magnetic or electric drive S, M, preferably a servomotor S. Here, only one single contact element can be actuated relative to at least one further one, or several or all contact elements can be actuated individually. The magnetic drive M or servomotor S can control a rotary actuation or a linear actuation of the contact element, preferably path- and/or force-controlled, or with a combination of path and force control, wherein preferably the contact time can also be individually selected.

Thanks to the individual actuation of at least one contact element of this gripper, the reject rate of incorrectly treated preforms or defective containers can be considerably reduced.

In FIG. 29 (two sectional representations allocated to each other), the preform P held at the holding arbor D is squeezed between two diametrically opposed contact elements as gripper claws 15a, 16a and positioned at the holding arbor D for manufacturing an oval preform for an oval container, wherein the actuation of the contact elements is, for example, controlled in a closed loop by a detection sensor 53' which measures, before or after the preferential heating process, the temperatures inside and/or outside of the preform P and transmits corresponding signals to the control for the respective magnetic drive M or servomotor S. As a third gripper claw 15b, in FIG. 29 a contact element is provided for controlling the temperature of the lower preform dome with respect to a certain bottom formation of the later container, the contact element being lifted or lowered, for example, by a linear magnetic drive or servomotor and being part of the gripper G. The contact elements are supplied and deform the preform P in a predetermined manner which is, for example, controlled by the detection sensor 53' in a closed loop, where they treat the preform P also properly centered with respect to the holding arbor D. Equally, a positioning of the sensor 53' inside the preform P is suitable, which is not shown in FIGS. 29 and 30.

FIG. 30 (three schematic sectional representations allocated to each other) illustrates a preform preferential heating process for controlling the temperature of the preform P for the later manufacture of an approximately square container, wherein the preform P obtains a special wall thickness distribution (here, for example, three different wall thickness regions) and a special bottom design (for example a petaloid bottom) which is reinforced at tension bands.

In FIG. 30, four lateral contact elements are provided as gripper claws 15a, 16a in a regular star-shaped distribution which are actuated either linearly or in a swiveling manner, wherein at least one contact element, optionally several contact elements or even all of them, comprises a separate magnetic drive M or servomotor S. Furthermore, as a fourth gripper claw 15b, a lower contact element is provided which consists of several parts movable relative with respect to each other and comprises, for example, three individual drives (servomotors, magnetic drives) to treat the lower dome of the preform P by closed-loop control. Here, too, for the closed-loop control of the contact of the contact elements with the preform P, at least one detection sensor 53' can be employed (see FIG. 29).

For example in FIG. 30, the right gripper claw 16a or the contact element representing the latter is contacted with a higher supply force (arrow) than the other ones, for example to withdraw a particularly high amount of heat and adjust the wall thickness in the contact region with a maximal degree. Similarly, the individual parts of the lower gripper claw 15b or the parts of this contact element can be individually adjusted to provide reinforced tension bands in a petaloid bottom to be blow molded. The magnetic drives M or servomotors S can be embodied as direct drives or act on the contact elements via threaded joints. The detection sensor 53' suitably is a so-called pyrometer. The contact elements of the gripper G can remain engaged until the temperature-controlled preform P is removed from the intermediate module 2, or it can be released from engagement already shortly before, where they preferably have previously properly centered the temperature-controlled preform P in the region of its main body treated by the preferential heating process in alignment with the mouth region held by the holding arbor D or the internal gripper to altogether minimize the reject rate of preforms or containers, respectively, by the controlled preferential heating process and the performed centering. The contact elements can be cooled and/or heated during the preferential heating process.

In a further suitable embodiment, the gripper claws can be also actuated by separate drives each at the holder into the defined gripping position and/or release position, and optionally even beyond these positions each. This can be done by path control and/or force control to be able to individually adapt the holding force or the opening and/or closing movement speeds or the respective motion strokes. Preferably, however, the actuation of each gripper claw is effected against at least one energy storage mechanism acting upon the gripper claws, e.g. towards the gripping position, such as a mechanical, magnetic or plastic spring which determines, for example, a certain basic holding force which can, however, be moreover individually controlled or adapted by the separate drives of the gripper claws. This actually uncontrolled, but by the separate drives of the gripper claws at least temporarily controlled gripper, is a particularly individual tool for mastering operational problems in the container treatment machine during the acceptance, delivery and transport of a preform or container. In particular, an actuation of gripper claws which are held in the opening position by a permanent magnet or a spring and only grip by the actuation of the container, or vice versa, is also thought of.

In a particularly suitable embodiment of a gripper of a container treatment machine comprising a cam gear, the cam gear comprises a symmetric or asymmetric, rotatably mounted cam, preferably an exchangeable cam from a kit of different asymmetric cams. This cam engages, at a predetermined distance from the swivel axes of the gripper claws, between the gripper claws or between gripper claw extensions. In this case, it can be suitable for an energy storage mechanism to pretension the gripper claws in the direction towards the gripping position and against the cam, which, however, actuates the swiveling gripper claws by different swivel angles while maintaining the gripping position when the common drive is activated. The cam generates the different swivel angles, for example, on the basis of the different distances of the points of application from the swivel axes of the gripper claws, wherein this effect can then be even reinforced with an asymmetric cam. Asymmetric here means a cam which comprises, for example, two cam projections or cam indentations of different heights and/or depths and/or angle orientations with respect to the axis of revolution of the cam.

In another suitable embodiment with a particularly simple cam gear and a common drive, a double cam that can be linearly moved by the drive and has cam faces of different slopes is provided, at which cam follower elements of the gripper claws or of gripper claw extensions act. Although the motion stroke of the double cam is the same for both gripper claws, by the different slopes of the cam face, the one gripper claw is actuated by a different swivel angle than the other one, while, however, the gripping position is maintained.

In another embodiment of the container treatment machine, in a transfer region from a transport section of a transfer starwheel equipped with grippers to an air transport device approximately tangential to the transfer starwheel, in particular for blow-molded containers, the gripper claw of the gripper lagging in the direction of transport can be actuated individually and independently of the advancing gripper claw into an acceleration position gripping behind the container in the air transport device and being at least approximately perpendicular to the direction of transport in the air transport device, and can then be held in this acceleration position during the bottom movement of the holder with the transfer starwheel. Such air transport devices common in container treatment plants in practice show problems in that the transferred containers cannot be accelerated quickly enough (by air jets in the direction of transport), so that a container jamming requiring the intervention of personnel occurs. The individual actuation of the gripper claws now permits to take care of the proper acceleration of the container, following transfer, by the gripper claw gripping behind it, so that situations of jamming are reliably avoided and the containers are transported away at predetermined distances. With this, the gripper fulfils an additional function by not only carrying out the transport and transfer of the container but moreover accelerating it preventively or forcefully after transfer. In particular, here an additional element could be mounted on the side of the gripper claw accelerating the container, e.g. at the gripper claw, which touches the container at a second higher or lower point to ensure a vertical orientation of the container during acceleration. The further element contacts the container e.g. near its center of gravity or further below, while the accelerating gripper claw contacts the container further at the top, e.g. at the neck, where it had held it until its transfer.

In another method of heat treating a preform in a preferential heating mode, the contact between the preform and the contact elements, then acting as gripper claws of a gripper, is controlled by activating at least one electric or magnetic drive for at least one contact element arranged at the holder or holder parts of the contact elements, preferably with a controllable servomotor, by individual and/or separate actuation of the contact elements acting as gripper claws while maintaining the gripping position, preferably taking into consideration a sensor signal of at least one sensor measuring the temperatures at the preform inside and/or outside. In the process, a path-dependent and/or force-dependent actuation of at least one of the contact elements is suitably accomplished, with adaptation to the type of container or preform and/or to the required individual deformation or squeezing. In this manner, not only the degree of squeezing necessary for the function can be sensitively controlled, but also the reaction force resulting from the contact with the contact element in the mouth region of the preform held at the holding arbor or internal gripper. Each contact element can be actuated individually and/or separately. The individual contact elements—in particular the respective parts of the contacting elements each lying on one side of the preform—can also be embodied in one piece, or be individually and/or separately actuated by a common mechanism, e.g. for exactly centering the preform at the holding arbor during the preferential heating process.

The invention claimed is:

1. A container treatment machine, comprising at least one gripper arranged on a holder for compulsory transport along a predetermined transport section for handling a preform or container during at least one of transport, an accepting process, a delivering process, and a combination thereof, the gripper comprising at least one activatable electric or magnetic drive for moving at least two gripper claws provided on swivel axes of a holder, wherein the gripper claws can swivel relative to the holder and relative to each other at least between defined gripping and release positions in a gripper opening direction or a gripper closing direction, and wherein both gripper claws can be actuated separately by the at least one activatable electric or magnetic drive to swivel at asymmetric swivel angles in the gripper opening or gripper closing directions.

2. The container treatment machine according to claim 1, wherein either one common drive or separate drives are provided for the gripper claws.

3. The container treatment machine according to claim 1, wherein the swivel axes are spaced apart on the holder such that the gripper claws are essentially parallel with each other in the gripping position.

4. The container treatment machine according to claim 2, wherein a respective separate magnetic drive of a gripper claw comprises inversely polarized permanent magnets connected with the gripper claw, and at least one magnet coil connected to the control.

5. The container treatment machine according to claim 2, wherein the one common drive or each of the separate drives is electric and comprises an electric servomotor connected to a control.

6. The container treatment machine according to claim 3, further comprising a common servomotor arranged at the holder and coupled with the gripper claws by one of a toothed or cam gear.

7. The container treatment machine according to claim 1, wherein one of selectively retrievable different holding force profiles, temperature control element contact pressure profiles, differently wide defined gripping positions of the gripper claws, and combinations thereof, for different or differently dimensioned types of preforms or containers, are stored in a control.

8. The container treatment machine according to claim 1, further comprising a detection sensor to provide a sensor signal indicating a demand to the activatable electric or magnetic drive, or a control to provide a control routine to the activatable electric or magnetic drive.

9. The container treatment machine according to claim 1, wherein gripper claws of a first gripper are arranged in a first running level, the first running level offset vertically from a second running level in which gripper claws of gripper of another transport section are arranged.

10. The container treatment machine according to claim 1, wherein, in a transfer region from one transport section to another one, the gripper claws of grippers provided at both transport sections are arranged in a common running level.

11. The container treatment machine according to claim 1, further comprising a transfer region from a transport section, a transfer starwheel equipped with grippers, and an air transport device approximately tangential to the transfer starwheel, wherein a gripper claw of a gripper involved in a transfer in the transfer region lagging in the direction of transport can be actuated in the transfer independently of an advancing gripper claw into an acceleration position in which the gripper claw of the lagging gripper grips a transferred container in the air transport device at least approximately perpendicular to the direction of transport in the air transport device during curved motion of the holder with the transfer starwheel.

12. The container treatment machine according to claim 1, further comprising a station of a container treatment machine embodied as a sterilizer or rinser and at least one sterilizing or rinsing agent inlet nozzle for one of sterilizing and rinsing a preform or container comprising a mouth with an opening rim, and wherein the gripper can be actuated, while aligning the mouth with the inlet nozzle and maintaining the gripping position, such that the position of the opening rim of the mouth is changed relative to the inlet nozzle.

13. The container treatment machine according to claim 5, wherein the electric servomotor comprises one of a force-controlled, path-controlled, and position-controlled servomotor.

14. The container treatment machine according to claim 13, wherein the servomotor is placed as a direct drive at the swivel axis or a shaft of the gripper claw in the holder or the servomotor is coupled to one of the swivel axis or the shaft via a toothed gearing.

15. A container treatment machine, comprising at least one gripper arranged on a holder for compulsory transport along a predetermined transport section for handling a preform or container during at least one of transport, an accepting process, a delivering process, and a combination thereof, the gripper comprising at least one activatable electric or magnetic drive for moving at least two gripper claws provided on swivel axes of a holder, wherein the two gripper claws can swivel about the swivel axis relative to the holder and relative to each other at least between defined gripping and release positions in a gripper opening direction or a gripper closing direction, wherein at least one gripper claw can be actuated to swivel relative to the holder and relative to the other gripper claw in one of the gripper opening or gripper closing directions or both gripper claws can be actuated swivel together or separately in the same one of the gripper opening or gripper closing directions, and wherein at least one of the gripper claws is adjustable telescopically in its longitudinal direction and comprises one of an electric or magnetic accessory telescoping drive.

16. The container treatment machine according to claim 15, wherein the gripper is a preform supply and delivery gripper in a starwheel of a blow molding station of a container treatment machine embodied as a stretch-blow molding machine comprising split blow molds, and a control of the common or of each separate drive of the gripper claws is connected with at least one sensor array by means of which a relative position between a preform ready to be transferred in the gripper and one of a center of, mold halves of, and a combination thereof of the blow mold, a stretching rod that remained in the blow mold due to a failure, and a combination thereof can be measured and evaluated for activating the drive to one of reposition the preform to the center of the blow mold, or to release the preform from the gripper.

17. The container treatment machine according to claim 16, wherein the at least one sensor array comprises one of a camera and a proximity initiator.

18. A container treatment machine, comprising at least one gripper arranged on a holder for compulsory transport along a predetermined transport section for handling a preform or container during at least one of transport, an accepting process, a delivering process, and a combination thereof, the gripper comprising at least one activatable electric or magnetic drive for moving at least two gripper claws provided on swivel axes of a holder, wherein the two gripper claws can swivel about the swivel axis relative to the holder and relative to each other at least between defined gripping and release positions in a gripper opening direction or a gripper closing direction, wherein at least one gripper claw can be actuated to swivel relative to the holder and relative to the other gripper claw in one of the gripper opening or gripper closing directions or both gripper claws can be actuated swivel together or separately in the same one of the gripper opening or gripper closing directions, wherein a respective separate magnetic drive of a gripper claw comprises inversely polarized permanent magnets connected with the gripper claw, and at least one magnet coil connected to the control, and wherein there are two or a plurality of magnet coils per gripper claw.

* * * * *